US009596317B2

(12) United States Patent
Daley et al.

(10) Patent No.: US 9,596,317 B2
(45) Date of Patent: Mar. 14, 2017

(54) METHOD AND SYSTEM FOR DELIVERY OF TARGETED INFORMATION BASED ON A USER PROFILE IN A MOBILE COMMUNICATION DEVICE

(75) Inventors: Robert S. Daley, Del Mar, CA (US); Pooja Aggarwal, Del Mar, CA (US); Dilip Krishnaswamy, Del Mar, CA (US); Patrik Lundqvist, Encinitas, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1732 days.

(21) Appl. No.: 12/134,659

(22) Filed: Jun. 6, 2008

(65) Prior Publication Data

US 2009/0011744 A1    Jan. 8, 2009

Related U.S. Application Data

(60) Provisional application No. 60/948,450, filed on Jul. 7, 2007, provisional application No. 60/948,451, filed on
(Continued)

(51) Int. Cl.
*H04M 3/42* (2006.01)
*H04M 1/725* (2006.01)
(Continued)

(52) U.S. Cl.
CPC ...... *H04L 67/306* (2013.01); *G06F 17/30867* (2013.01); *G06F 21/10* (2013.01);
(Continued)

(58) Field of Classification Search
CPC .................................................... H04L 67/306
(Continued)

(56) References Cited

U.S. PATENT DOCUMENTS

| 645,701 A | 3/1900 | Jean |
| 2,175,937 A | 10/1939 | Elder et al. |

(Continued)

FOREIGN PATENT DOCUMENTS

| CN | 1201546 A | 12/1998 |
| CN | 1337129 A | 2/2002 |

(Continued)

OTHER PUBLICATIONS

Barbeau M et al: "Perfect identity concealment in UMTS over radio access links" Wireless and Mobile Computing, Networking and Communications, 2005. (W IMOB' 2005), IEEE International Conference on Montreal, Canada Aug. 22-24, 2005, Piscataway, NJ, USA IEEE, vol. 2, Aug. 22, 2005, pp. 72-77, XP010838822 ISBN: 978-0-7803-9181-9.

(Continued)

*Primary Examiner* — Nathan Mitchell
(74) *Attorney, Agent, or Firm* — Alan Gordon; Charles E. Eggers

(57) ABSTRACT

Methods and systems for receiving targeted content messages on a wireless access terminal (W-AT) are disclosed. For example, a particular method may include selecting at least one reception time based on a user profile and a targeted content message delivery schedule, and receiving a targeted content message at the selected reception time.

33 Claims, 10 Drawing Sheets

Related U.S. Application Data on Jul. 7, 2007, provisional application No. 60/948,452, filed on Jul. 7, 2007, provisional application No. 60/948,453, filed on Jul. 7, 2007, provisional application No. 60/948,455, filed on Jul. 7, 2007, provisional application No. 60/948,456, filed on Jul. 7, 2007.

(51) Int. Cl.

| | | |
|---|---|---|
| *H04M 3/00* | (2006.01) | |
| *G06Q 30/00* | (2012.01) | |
| *H04L 29/08* | (2006.01) | |
| *H04W 4/12* | (2009.01) | |
| *H04W 4/02* | (2009.01) | |
| *H04W 64/00* | (2009.01) | |
| *H04W 8/24* | (2009.01) | |
| *G06F 17/30* | (2006.01) | |
| *G06F 21/10* | (2013.01) | |
| *G06F 21/62* | (2013.01) | |
| *G06Q 30/02* | (2012.01) | |

(52) U.S. Cl.
CPC ......... *G06F 21/6254* (2013.01); *G06Q 30/02* (2013.01); *G06Q 30/0251* (2013.01); *G06Q 30/0267* (2013.01); *G06Q 30/0269* (2013.01); *H04L 67/025* (2013.01); *H04L 67/22* (2013.01); *H04W 4/02* (2013.01); *H04W 4/12* (2013.01); *H04W 8/245* (2013.01); *H04W 64/00* (2013.01); *G06F 2221/0724* (2013.01); *G06F 2221/0731* (2013.01); *G06F 2221/0742* (2013.01); *G06F 2221/0744* (2013.01); *G06F 2221/0759* (2013.01); *G06F 2221/0768* (2013.01); *G06F 2221/0775* (2013.01); *G06F 2221/2101* (2013.01); *G06F 2221/2103* (2013.01); *G06F 2221/2113* (2013.01); *G06F 2221/2115* (2013.01); *G06F 2221/2117* (2013.01); *G06F 2221/2129* (2013.01); *G06F 2221/2135* (2013.01); *G06F 2221/2141* (2013.01); *G06F 2221/2143* (2013.01); *G06F 2221/2145* (2013.01); *G06F 2221/2151* (2013.01)

(58) Field of Classification Search
USPC ............... 455/414.1, 412.1, 412.2, 418, 419; 705/14.64, 14.66, 14.67
See application file for complete search history.

(56) References Cited

U.S. PATENT DOCUMENTS

| | | | |
|---|---|---|---|
| 3,779,357 A | 12/1973 | Haller et al. | |
| 5,557,721 A | 9/1996 | Fite et al. | |
| 5,559,984 A | 9/1996 | Nakano et al. | |
| 5,664,126 A | 9/1997 | Hirakawa et al. | |
| 5,754,938 A | 5/1998 | Herz et al. | |
| 5,754,939 A | 5/1998 | Herz et al. | |
| 5,778,436 A | 7/1998 | Kedem et al. | |
| 5,848,397 A * | 12/1998 | Marsh et al. ............... | 705/14.61 |
| 5,948,061 A | 9/1999 | Merriman et al. | |
| 5,961,593 A | 10/1999 | Gabber et al. | |
| 5,987,476 A | 11/1999 | Imai et al. | |
| 6,002,672 A | 12/1999 | Todd | |
| 6,105,028 A | 8/2000 | Sullivan et al. | |
| 6,112,186 A | 8/2000 | Bergh et al. | |
| 6,112,203 A | 8/2000 | Bharat et al. | |
| 6,119,098 A | 9/2000 | Guyot et al. | |
| 6,157,945 A | 12/2000 | Balma et al. | |
| 6,177,931 B1 | 1/2001 | Alexander et al. | |
| 6,202,058 B1 | 3/2001 | Rose et al. | |
| 6,216,129 B1 | 4/2001 | Eldering | |
| 6,256,633 B1 | 7/2001 | Dharap | |
| 6,314,451 B1 | 11/2001 | Landsman et al. | |
| 6,360,096 B1 | 3/2002 | Charpentier et al. | |
| 6,411,807 B1 | 6/2002 | Amin et al. | |
| 6,421,673 B1 | 7/2002 | Caldwell et al. | |
| 6,457,010 B1 | 9/2002 | Eldering et al. | |
| 6,460,036 B1 | 10/2002 | Herz | |
| 6,484,148 B1 | 11/2002 | Boyd | |
| 6,507,279 B2 | 1/2003 | Loof | |
| 6,510,318 B1 | 1/2003 | Minagawa | |
| 6,526,440 B1 | 2/2003 | Bharat | |
| 6,567,660 B1 * | 5/2003 | Wegener ................ | H04H 20/42 455/3.01 |
| 6,571,279 B1 | 5/2003 | Herz et al. | |
| 6,601,103 B1 | 7/2003 | Goldschmidt Iki et al. | |
| 6,611,684 B1 | 8/2003 | Franks | |
| 6,647,257 B2 | 11/2003 | Owensby | |
| 6,654,813 B1 | 11/2003 | Black et al. | |
| 6,668,378 B2 | 12/2003 | Leak et al. | |
| 6,671,732 B1 | 12/2003 | Weiner | |
| 6,677,894 B2 | 1/2004 | Sheynblat et al. | |
| 6,738,678 B1 | 5/2004 | Bharat et al. | |
| 6,738,808 B1 | 5/2004 | Zellner et al. | |
| 6,834,294 B1 | 12/2004 | Katz | |
| 6,847,959 B1 | 1/2005 | Arrouye et al. | |
| 6,873,834 B1 | 3/2005 | Edwards et al. | |
| 6,889,224 B2 | 5/2005 | Smith | |
| 6,895,387 B1 | 5/2005 | Roberts et al. | |
| 6,912,398 B1 | 6/2005 | Domnitz | |
| 6,947,910 B2 | 9/2005 | Hsu et al. | |
| 6,968,178 B2 | 11/2005 | Pradhan et al. | |
| 6,981,040 B1 | 12/2005 | Konig et al. | |
| 7,003,792 B1 | 2/2006 | Yuen | |
| 7,065,525 B1 | 6/2006 | Sasaki et al. | |
| 7,069,259 B2 | 6/2006 | Horvitz et al. | |
| 7,069,319 B2 | 6/2006 | Zellner et al. | |
| 7,120,615 B2 | 10/2006 | Sullivan et al. | |
| 7,136,871 B2 * | 11/2006 | Ozer et al. | |
| 7,149,704 B2 * | 12/2006 | Martin et al. ................. | 705/7.32 |
| 7,150,030 B1 | 12/2006 | Eldering et al. | |
| 7,222,101 B2 | 5/2007 | Bishop et al. | |
| 7,248,861 B2 | 7/2007 | Lazaridis et al. | |
| 7,254,643 B1 | 8/2007 | Peters, Jr. et al. | |
| 7,274,684 B2 | 9/2007 | Young et al. | |
| 7,289,971 B1 | 10/2007 | O'Neil et al. | |
| 7,312,752 B2 | 12/2007 | Smith et al. | |
| 7,330,824 B1 * | 2/2008 | Kanojia et al. ............ | 705/14.61 |
| 7,356,530 B2 | 4/2008 | Kim et al. | |
| 7,363,035 B2 | 4/2008 | Reilly | |
| 7,370,073 B2 * | 5/2008 | Yen et al. ...................... | 709/203 |
| 7,401,121 B2 * | 7/2008 | Wong et al. .................. | 709/204 |
| 7,403,980 B2 | 7/2008 | Stringer-Calvert et al. | |
| 7,433,918 B2 | 10/2008 | Rivers et al. | |
| 7,523,112 B2 | 4/2009 | Hassan et al. | |
| 7,530,020 B2 | 5/2009 | Szabo | |
| 7,535,884 B2 * | 5/2009 | Stephenson et al. ......... | 370/338 |
| 7,552,433 B2 | 6/2009 | Brothers | |
| 7,577,732 B2 | 8/2009 | Yasui et al. | |
| 7,596,591 B2 | 9/2009 | Titmuss | |
| 7,610,280 B2 | 10/2009 | OToole et al. | |
| 7,657,522 B1 | 2/2010 | Puzicha et al. | |
| 7,657,639 B2 | 2/2010 | Hinton | |
| 7,668,922 B2 | 2/2010 | Garbow et al. | |
| 7,689,510 B2 | 3/2010 | Lamkin et al. | |
| 7,689,682 B1 | 3/2010 | Eldering et al. | |
| 7,690,013 B1 | 3/2010 | Eldering et al. | |
| 7,707,167 B2 | 4/2010 | Kishore et al. | |
| 7,711,004 B2 * | 5/2010 | Xu .................. | 370/468 |
| 7,711,475 B1 | 5/2010 | Cona et al. | |
| 7,716,161 B2 | 5/2010 | Dean et al. | |
| 7,801,554 B2 | 9/2010 | Fujimoto | |
| 7,805,129 B1 | 9/2010 | Issa et al. | |
| 7,860,922 B2 | 12/2010 | Singer et al. | |
| 7,979,509 B1 | 7/2011 | Malmskog et al. | |
| 8,095,582 B2 | 1/2012 | Cramer | |
| 8,108,245 B1 | 1/2012 | Hosea et al. | |
| 2001/0013088 A1 | 8/2001 | Matsumoto | |
| 2001/0021994 A1 | 9/2001 | Nash | |
| 2001/0036224 A1 | 11/2001 | Demello et al. | |

(56) References Cited

U.S. PATENT DOCUMENTS

| | | |
|---|---|---|
| 2001/0047272 A1* | 11/2001 | Frietas et al. ............. 705/1 |
| 2002/0003162 A1 | 1/2002 | Ferber et al. |
| 2002/0004855 A1 | 1/2002 | Cox et al. |
| 2002/0010625 A1 | 1/2002 | Smith et al. |
| 2002/0019764 A1 | 2/2002 | Mascarenhas |
| 2002/0032771 A1* | 3/2002 | Gledje ............. 709/224 |
| 2002/0046084 A1 | 4/2002 | Steele et al. |
| 2002/0062251 A1 | 5/2002 | Anandan et al. |
| 2002/0069105 A1 | 6/2002 | do Rosario Botelho et al. |
| 2002/0083443 A1 | 6/2002 | Eldering et al. |
| 2002/0087401 A1 | 7/2002 | Leapman et al. |
| 2002/0091568 A1 | 7/2002 | Kraft et al. |
| 2002/0099824 A1 | 7/2002 | Bender et al. |
| 2002/0138331 A1 | 9/2002 | Hosea et al. |
| 2002/0144262 A1* | 10/2002 | Plotnick et al. ............. 725/32 |
| 2002/0147645 A1 | 10/2002 | Alao et al. |
| 2002/0152117 A1* | 10/2002 | Cristofalo et al. ............. 705/14 |
| 2002/0156351 A1 | 10/2002 | Sagel |
| 2002/0198777 A1 | 12/2002 | Yuasa |
| 2002/0199190 A1 | 12/2002 | Su |
| 2003/0003929 A1* | 1/2003 | Himmel ............. H04L 29/06 455/466 |
| 2003/0009593 A1 | 1/2003 | Apte |
| 2003/0023489 A1 | 1/2003 | McGuire et al. |
| 2003/0031164 A1 | 2/2003 | Nabkel et al. |
| 2003/0040332 A1 | 2/2003 | Swartz et al. |
| 2003/0046269 A1 | 3/2003 | Yamazaki |
| 2003/0055729 A1 | 3/2003 | Bezos et al. |
| 2003/0073455 A1 | 4/2003 | Hashem et al. |
| 2003/0110080 A1 | 6/2003 | Tsutani et al. |
| 2003/0130887 A1 | 7/2003 | Nathaniel |
| 2003/0182567 A1 | 9/2003 | Barton et al. |
| 2004/0002932 A1 | 1/2004 | Horvitz et al. |
| 2004/0025174 A1 | 2/2004 | Cerrato |
| 2004/0093418 A1 | 5/2004 | Tuomi |
| 2004/0121774 A1 | 6/2004 | Rajkotia et al. |
| 2004/0128347 A1 | 7/2004 | Mason et al. |
| 2004/0139204 A1 | 7/2004 | Ergezinger et al. |
| 2004/0165006 A1 | 8/2004 | Kirby et al. |
| 2004/0209602 A1 | 10/2004 | Joyce et al. |
| 2004/0243482 A1 | 12/2004 | Laut |
| 2004/0267723 A1 | 12/2004 | Bharat |
| 2005/0063365 A1 | 3/2005 | Mathew et al. |
| 2005/0120003 A1 | 6/2005 | Drury et al. |
| 2005/0128995 A1 | 6/2005 | Ott et al. |
| 2005/0154840 A1 | 7/2005 | Greer et al. |
| 2005/0196139 A1 | 9/2005 | Blackketter et al. |
| 2005/0204003 A1 | 9/2005 | Vargas et al. |
| 2005/0210243 A1 | 9/2005 | Archard et al. |
| 2005/0215236 A1 | 9/2005 | Myka et al. |
| 2005/0215238 A1 | 9/2005 | Macaluso |
| 2005/0216823 A1 | 9/2005 | Petersen et al. |
| 2005/0222989 A1 | 10/2005 | Haveliwala et al. |
| 2005/0240580 A1 | 10/2005 | Zamir et al. |
| 2005/0251325 A1 | 11/2005 | Kudo et al. |
| 2005/0262043 A1* | 11/2005 | Saito ............. 707/1 |
| 2005/0262246 A1 | 11/2005 | Menon et al. |
| 2005/0270992 A1 | 12/2005 | Sanzgiri et al. |
| 2005/0286463 A1 | 12/2005 | Matsumoto |
| 2005/0289001 A1 | 12/2005 | Parnau |
| 2006/0008918 A1 | 1/2006 | Probert et al. |
| 2006/0020972 A1* | 1/2006 | Regan ............. H04H 20/426 725/46 |
| 2006/0031368 A1 | 2/2006 | DeCone |
| 2006/0039303 A1 | 2/2006 | Singer et al. |
| 2006/0041472 A1* | 2/2006 | Lukose ............. G06Q 30/00 705/14.66 |
| 2006/0041638 A1 | 2/2006 | Whittaker et al. |
| 2006/0053077 A1* | 3/2006 | Mourad et al. ............. 705/51 |
| 2006/0059183 A1 | 3/2006 | Pearson et al. |
| 2006/0064346 A1 | 3/2006 | Steenstra et al. |
| 2006/0064386 A1 | 3/2006 | Marking |
| 2006/0069749 A1 | 3/2006 | Herz et al. |
| 2006/0089128 A1 | 4/2006 | Smith et al. |
| 2006/0089138 A1 | 4/2006 | Smith et al. |
| 2006/0129931 A1 | 6/2006 | Simons et al. |
| 2006/0133400 A1 | 6/2006 | Koo et al. |
| 2006/0136742 A1 | 6/2006 | Giobbi |
| 2006/0161599 A1 | 7/2006 | Rosen |
| 2006/0168664 A1 | 7/2006 | Frank et al. |
| 2006/0184421 A1 | 8/2006 | Lipsky et al. |
| 2006/0194569 A1 | 8/2006 | Hsueh |
| 2006/0195260 A1 | 8/2006 | Gronemeyer |
| 2006/0212350 A1 | 9/2006 | Ellis et al. |
| 2006/0245441 A1 | 11/2006 | Chen et al. |
| 2006/0248558 A1 | 11/2006 | Barton et al. |
| 2006/0259473 A1 | 11/2006 | Li et al. |
| 2006/0271425 A1 | 11/2006 | Goodman et al. |
| 2006/0277098 A1* | 12/2006 | Chung et al. ............. 705/14 |
| 2006/0277271 A1 | 12/2006 | Morse et al. |
| 2006/0293065 A1 | 12/2006 | Chew et al. |
| 2006/0294084 A1 | 12/2006 | Patel et al. |
| 2007/0005419 A1 | 1/2007 | Horvitz et al. |
| 2007/0011155 A1 | 1/2007 | Sarkar |
| 2007/0022098 A1 | 1/2007 | Malik |
| 2007/0022375 A1 | 1/2007 | Walker |
| 2007/0037610 A1 | 2/2007 | Logan |
| 2007/0066226 A1 | 3/2007 | Cleveland et al. |
| 2007/0072622 A1 | 3/2007 | Ishibashi et al. |
| 2007/0088603 A1 | 4/2007 | Jouppi et al. |
| 2007/0088801 A1 | 4/2007 | Levkovitz et al. |
| 2007/0130343 A1 | 6/2007 | Pardo-Blazquez et al. |
| 2007/0136742 A1* | 6/2007 | Sparrell ............. 725/32 |
| 2007/0156962 A1 | 7/2007 | Hodge et al. |
| 2007/0168461 A1 | 7/2007 | Moore |
| 2007/0174114 A1 | 7/2007 | Bigby et al. |
| 2007/0180144 A1 | 8/2007 | Basu et al. |
| 2007/0201468 A1* | 8/2007 | Jokela ............. 370/390 |
| 2007/0208728 A1 | 9/2007 | Zhang et al. |
| 2007/0208937 A1 | 9/2007 | Cam-Winget et al. |
| 2007/0233571 A1 | 10/2007 | Eldering et al. |
| 2007/0244750 A1 | 10/2007 | Grannan et al. |
| 2007/0258460 A1 | 11/2007 | Momtahan et al. |
| 2007/0265090 A1 | 11/2007 | Barsness et al. |
| 2007/0288433 A1 | 12/2007 | Gupta et al. |
| 2007/0288543 A1 | 12/2007 | Evans et al. |
| 2008/0004949 A1 | 1/2008 | Flake et al. |
| 2008/0004952 A1 | 1/2008 | Koli |
| 2008/0060000 A1 | 3/2008 | Drouet et al. |
| 2008/0077502 A1* | 3/2008 | Boyd ............. 705/14 |
| 2008/0077741 A1 | 3/2008 | Yasui et al. |
| 2008/0082417 A1 | 4/2008 | Publicover |
| 2008/0090513 A1 | 4/2008 | Collins et al. |
| 2008/0091796 A1 | 4/2008 | Story et al. |
| 2008/0092168 A1 | 4/2008 | Logan et al. |
| 2008/0092171 A1 | 4/2008 | Roberts et al. |
| 2008/0098420 A1 | 4/2008 | Khivesara et al. |
| 2008/0103971 A1 | 5/2008 | Lukose et al. |
| 2008/0109376 A1 | 5/2008 | Walsh et al. |
| 2008/0133336 A1 | 6/2008 | Altman et al. |
| 2008/0133364 A1 | 6/2008 | Ullah |
| 2008/0140667 A1 | 6/2008 | LaBiche |
| 2008/0140941 A1 | 6/2008 | Dasgupta et al. |
| 2008/0141321 A1 | 6/2008 | Kubat et al. |
| 2008/0165711 A1 | 7/2008 | Wyld |
| 2008/0177726 A1 | 7/2008 | Forbes et al. |
| 2008/0214153 A1 | 9/2008 | Ramer et al. |
| 2008/0214156 A1 | 9/2008 | Ramer et al. |
| 2008/0215426 A1 | 9/2008 | Guldimann et al. |
| 2008/0215623 A1 | 9/2008 | Ramer et al. |
| 2008/0238610 A1 | 10/2008 | Rosenberg |
| 2008/0243811 A1 | 10/2008 | He et al. |
| 2008/0249987 A1 | 10/2008 | Ogasawara |
| 2008/0270417 A1 | 10/2008 | Roker |
| 2008/0276266 A1 | 11/2008 | Huchital et al. |
| 2008/0281940 A1* | 11/2008 | Coxhill ............. 709/217 |
| 2008/0288355 A1 | 11/2008 | Rosen |
| 2008/0290987 A1 | 11/2008 | Li |
| 2008/0293375 A1 | 11/2008 | Swanburg |
| 2008/0301149 A1 | 12/2008 | Malcolm |
| 2008/0313033 A1* | 12/2008 | Guo ............. G06Q 30/02 705/14.39 |
| 2009/0006183 A1 | 1/2009 | Paintin et al. |
| 2009/0011740 A1 | 1/2009 | Aggarwal et al. |

(56) References Cited

U.S. PATENT DOCUMENTS

| | | | |
|---|---|---|---|
| 2009/0012861 A1 | 1/2009 | Krishnaswamy et al. |
| 2009/0013024 A1 | 1/2009 | Aggarwal et al. |
| 2009/0013051 A1 | 1/2009 | Renschler et al. |
| 2009/0044246 A1 | 2/2009 | Sheehan et al. |
| 2009/0048977 A1 | 2/2009 | Aggarwal et al. |
| 2009/0049090 A1 | 2/2009 | Shenfield et al. |
| 2009/0061884 A1 | 3/2009 | Rajan et al. |
| 2009/0070700 A1 | 3/2009 | Johanson |
| 2009/0076882 A1 | 3/2009 | Mei et al. |
| 2009/0077220 A1 | 3/2009 | Svendsen et al. |
| 2009/0083147 A1 | 3/2009 | Paila et al. |
| 2009/0089352 A1 | 4/2009 | Davis et al. |
| 2009/0094248 A1 | 4/2009 | Petersen |
| 2009/0124241 A1 | 5/2009 | Krishnaswamy et al. |
| 2009/0125321 A1 | 5/2009 | Charlebois et al. |
| 2009/0125462 A1 | 5/2009 | Krishnaswamy et al. |
| 2009/0125517 A1 | 5/2009 | Krishnaswamy et al. |
| 2009/0125585 A1 | 5/2009 | Krishnaswamy et al. |
| 2009/0150238 A1 | 6/2009 | Marsh et al. |
| 2009/0157512 A1 | 6/2009 | King |
| 2009/0157834 A1 | 6/2009 | Krishnaswamy |
| 2009/0177530 A1 | 7/2009 | King et al. |
| 2009/0187939 A1* | 7/2009 | Lajoie .................. G06Q 30/02 725/34 |
| 2009/0216847 A1 | 8/2009 | Krishnaswamy et al. |
| 2009/0234708 A1 | 9/2009 | Heiser, II et al. |
| 2009/0319329 A1 | 12/2009 | Aggarwal et al. |
| 2010/0010733 A1 | 1/2010 | Krumm |
| 2010/0030713 A1 | 2/2010 | Simpson et al. |
| 2010/0057563 A1 | 3/2010 | Rauber et al. |
| 2010/0057924 A1 | 3/2010 | Rauber et al. |
| 2010/0064354 A1 | 3/2010 | Irvine |
| 2010/0217881 A1 | 8/2010 | Iino et al. |
| 2010/0293057 A1 | 11/2010 | Haveliwala et al. |
| 2011/0282964 A1 | 11/2011 | Krishnaswamy et al. |
| 2011/0283355 A1 | 11/2011 | Livshits et al. |

FOREIGN PATENT DOCUMENTS

| | | |
|---|---|---|
| CN | 1643886 A | 7/2005 |
| CN | 1645366 A | 7/2005 |
| CN | 1692352 A | 11/2005 |
| CN | 1714360 A | 12/2005 |
| CN | 1751470 A | 3/2006 |
| CN | 101019118 A | 8/2007 |
| EP | 0855659 A1 | 7/1998 |
| EP | 1111824 A2 | 6/2001 |
| EP | 1524611 A2 | 4/2005 |
| EP | 1638047 A1 | 3/2006 |
| FR | 2878670 | 6/2006 |
| GB | 2430524 A | 3/2007 |
| JP | 1162028 A | 6/1989 |
| JP | 3122770 A | 5/1991 |
| JP | 9051314 A | 2/1997 |
| JP | 10063618 A | 3/1998 |
| JP | 10254807 A | 9/1998 |
| JP | 10294676 A | 11/1998 |
| JP | 11136365 A | 5/1999 |
| JP | 11312190 A | 11/1999 |
| JP | 2000040049 A | 2/2000 |
| JP | 2000041063 A | 2/2000 |
| JP | 2000148864 A | 5/2000 |
| JP | 2000155764 A | 6/2000 |
| JP | 2001014332 A | 1/2001 |
| JP | 2001117977 A | 4/2001 |
| JP | 2001128097 A | 5/2001 |
| JP | 2001175672 A | 6/2001 |
| JP | 2001203811 A | 7/2001 |
| JP | 2001222491 A | 8/2001 |
| JP | 2001224055 A | 8/2001 |
| JP | 2001238192 A | 8/2001 |
| JP | 2001251576 A | 9/2001 |
| JP | 2001266010 A | 9/2001 |
| JP | 2001273298 A | 10/2001 |
| JP | 2001306934 A | 11/2001 |
| JP | 2002135221 A | 5/2002 |
| JP | 2002197342 A | 7/2002 |
| JP | 2002197356 A | 7/2002 |
| JP | 2002199460 A | 7/2002 |
| JP | 2002271855 A | 9/2002 |
| JP | 2002531895 A | 9/2002 |
| JP | 2002325069 A | 11/2002 |
| JP | 2002333853 A | 11/2002 |
| JP | 2002334248 A | 11/2002 |
| JP | 2002366819 A | 12/2002 |
| JP | 2003018085 A | 1/2003 |
| JP | 03050820 A | 2/2003 |
| JP | 03050932 A | 2/2003 |
| JP | 2003043970 A | 2/2003 |
| JP | 03069626 A | 3/2003 |
| JP | 03196128 A | 7/2003 |
| JP | 03196305 A | 7/2003 |
| JP | 03208381 A | 7/2003 |
| JP | 2003242411 A | 8/2003 |
| JP | 03526824 A | 9/2003 |
| JP | 03283652 A | 10/2003 |
| JP | 03316742 A | 11/2003 |
| JP | 2004005080 A | 1/2004 |
| JP | 2004007850 A | 1/2004 |
| JP | 2004013426 A | 1/2004 |
| JP | 2004505522 A | 2/2004 |
| JP | 2004086560 A | 3/2004 |
| JP | 2004511836 A | 4/2004 |
| JP | 2004138692 A | 5/2004 |
| JP | 2004514217 A | 5/2004 |
| JP | 2004514218 A | 5/2004 |
| JP | 2004265375 A | 9/2004 |
| JP | 2004294264 A | 10/2004 |
| JP | 2004320153 A | 11/2004 |
| JP | 2004357311 A | 12/2004 |
| JP | 2005503598 A | 2/2005 |
| JP | 2005070889 A | 3/2005 |
| JP | 2005107728 A | 4/2005 |
| JP | 2005513887 A | 5/2005 |
| JP | 2005175865 A | 6/2005 |
| JP | 2006031204 A | 2/2006 |
| JP | 2006053767 A | 2/2006 |
| JP | 2006120135 A | 5/2006 |
| JP | 2006185169 A | 7/2006 |
| JP | 2006203593 A | 8/2006 |
| JP | 2006215956 A | 8/2006 |
| JP | 2006252354 A | 9/2006 |
| JP | 2006261956 A | 9/2006 |
| JP | 2006524857 A | 11/2006 |
| JP | 2006526817 A | 11/2006 |
| JP | 2006527960 A | 12/2006 |
| JP | 2007017841 A | 1/2007 |
| JP | 2007048226 A | 2/2007 |
| JP | 2007507801 A | 3/2007 |
| JP | 2007089131 A | 4/2007 |
| JP | 2007094560 A | 4/2007 |
| JP | 2007517321 A | 6/2007 |
| JP | 2007241921 A | 9/2007 |
| JP | 2007263972 A | 10/2007 |
| JP | 2007264764 A | 10/2007 |
| JP | 2007280363 A | 10/2007 |
| JP | 2008525875 A | 7/2008 |
| JP | 2008545200 A | 12/2008 |
| JP | 2008546075 A | 12/2008 |
| JP | 2009522960 | 6/2009 |
| KR | 1020010024837 | 3/2001 |
| KR | 1020010042008 | 5/2001 |
| KR | 2004040779 A | 5/2004 |
| KR | 2004040799 A | 5/2004 |
| KR | 1020050074310 | 7/2005 |
| KR | 2006017990 A | 2/2006 |
| KR | 20070038146 | 4/2007 |
| WO | 9726729 A2 | 7/1997 |
| WO | 9936853 A1 | 7/1999 |
| WO | 9950745 A1 | 10/1999 |
| WO | WO9967698 A2 | 12/1999 |
| WO | 0035216 A1 | 6/2000 |
| WO | WO0128273 A1 | 4/2001 |

(56) References Cited

FOREIGN PATENT DOCUMENTS

| WO | WO-0172102 A2 | 10/2001 |
|---|---|---|
| WO | WO-0195140 A2 | 12/2001 |
| WO | 0207493 A2 | 1/2002 |
| WO | 02063426 A2 | 8/2002 |
| WO | 03053080 | 6/2003 |
| WO | WO03079655 A1 | 9/2003 |
| WO | 2004081793 A1 | 9/2004 |
| WO | 2004114156 A1 | 12/2004 |
| WO | 2005033979 A1 | 4/2005 |
| WO | 2005065229 A2 | 7/2005 |
| WO | 2006014562 A1 | 2/2006 |
| WO | WO2006017364 | 2/2006 |
| WO | 2006067652 A2 | 6/2006 |
| WO | 2006135522 A2 | 12/2006 |
| WO | WO2007015183 | 2/2007 |
| WO | 2007033358 A2 | 3/2007 |
| WO | 2007045257 A1 | 4/2007 |
| WO | 2007058683 A1 | 5/2007 |
| WO | 2007082190 | 7/2007 |

OTHER PUBLICATIONS

International Search Report and Written Opinion—PCT/US2008/069374, International Search Authority—European Patent Office—Jan. 16, 2009.

Microsoft, SQL Server 2000 Databases on the Desktop [online] 2004 [retrieved on May 25, 2012]. Retrieved from the Internet< URL:http://msdn.microsoft.com/en-us/library/aa224749(v=sql.80).aspx>.

Ulucan S, "A Recommendation System Combining Context-Awareness and User Profiling in Mobile Environment" [online],Dec. 2005, 122 Pages.[retrieved on Dec. 12, 2011]. Retrieved from the internet: <URL:http://etd.lib.metu.edu.tr/upload/12606845/index.pdf>.

Current Comments—Junk Mail and Targeted Direct Mail Marketing—There is a Difference! (Current Comments, Essays of an Information Scientist, vol. 6, p. 1-5, 1983 Current Contents, #1, p. 5-9, Jan. 3, 1983, author unknown).

* cited by examiner

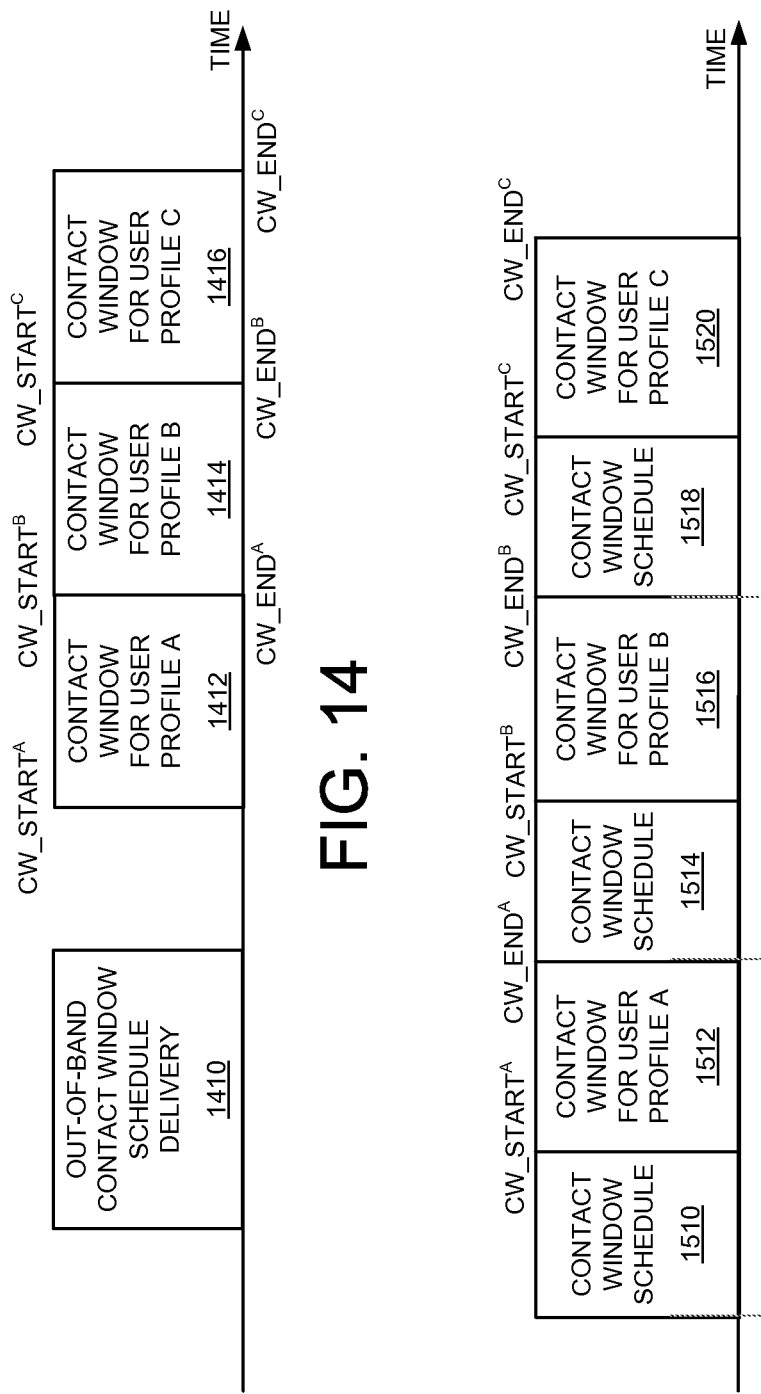

METHOD AND SYSTEM FOR DELIVERY OF TARGETED INFORMATION BASED ON A USER PROFILE IN A MOBILE COMMUNICATION DEVICE

RELATED APPLICATIONS

The present Application for Patent claims priority to Provisional Application No. 60/948,450 entitled "USER PROFILE GENERATION ARCHITECTURE FOR MOBILE ADVERTISING" filed Jul. 7, 2007, and Provisional Application No. 60/948,451 entitled "USER PROFILE GENERATION ARCHITECTURE FOR MOBILE ADVERTISING USING SECURE EXTERNAL PROCESSES" filed Jul. 7, 2007, and Provisional Application No. 60/948,452 entitled "METHOD AND SYSTEM FOR PROVIDING TARGETED ADVERTISING BASED ON A USER IN A MOBILE ENVIRONMENT" filed Jul. 7, 2007, and Provisional Application No. 60/948,453 entitled "USER PROFILE GENERATION ARCHITECTURE FOR MOBILE ADVERTISING USING PROFILE ATTRIBUTES HAVING VARIABLE CONFIDENCE LEVELS" filed Jul. 7, 2007, and Provisional Application No. 60/948,455 entitled "METHOD AND SYSTEM FOR DELIVERY OF TARGETED ADVERTISING BASED ON A USER PROFILE IN A MOBILE COMMUNICATION DEVICE" filed Jul. 7, 2007, and Provisional Application No. 60/948,456 entitled "USER PROFILE GENERATION ARCHITECTURE FOR MOBILE ADVERTISING" filed Jul. 7, 2007, all of which are assigned to the assignee hereof and hereby expressly incorporated by reference herein in their entirety.

FIELD OF THE DISCLOSURE

This disclosure relates to wireless communications. In particular, the present disclosure relates to wireless communications systems usable for targeted content-message and related transactions.

BACKGROUND

Mobile Targeted-Content-Message (TCM)-enabled systems can be described as systems capable of delivering targeted content information, such as local weather reports and advertisements targeted to a particular demographic, to wireless communication devices (WCDs), such as cellular telephones or other forms of wireless access terminals (W-ATs). Such systems may also provide a better user experience by presenting non-intrusive targeted-content-messages that are likely to be of interest to a user.

An example of a mobile TCM-enabled system is a mobile advertising system capable of delivering advertisements to wireless communication devices (WCDs). Generally, a mobile advertising system can provide such things as an advertisement sales conduit for a cellular provider to provide advertisements on a W-AT, as well as some form of analytical interface to report back on the performance of various advertisement campaigns. A particular consumer benefit of mobile advertising is that it can provide alternate/additional revenue models for wireless services so as to allow more economical access to the wireless services to those consumers willing to accept advertisements. For example, the revenue generated through advertising may allow W-AT users to enjoy various services without paying the full subscription price usually associated with such services.

In order to increase the effectiveness of TCMs on W-ATs, it can be beneficial to provide targeted information, i.e., TCMs which are deemed likely to be well received by, and/or of likely interest to, a particular person or a designated group of people.

Targeted-Content-Message (TCM) information can be based on immediate needs or circumstances, such as a need to find emergency roadside service or the need for information about a travel route. Targeted-Content-Message information can also be based on specific products or services (e.g., games) for which a user has demonstrated past interest, and/or based on demographics, for example, a determination of an age and income group likely to be interested in a particular product. Targeted Advertisements are an example of TCMs.

Targeted advertisements can provide a number of advantages (over general advertisements) including: (1) in an economic structure based on cost per view, an advertiser may be able to increase the value of his advertising budget by limiting paid advertising to a smaller set of prospects; and (2) as targeted advertisements are likely to represent areas of interest for a particular user, the likelihood that users will respond positively to targeted advertisements increases substantially.

Unfortunately, the information that makes some forms of targeted advertising possible may be restricted due to government regulations and the desire of people to limit the dissemination of their personal information. For example, in the US, such government restrictions include the Graham-Leach-Bliley Act (GLBA), Title 47 of the United States Code, Section 222—"Privacy of Customer Information." In comparison, the European Union has a policy of protecting "personal data" or "any information relating to an identified or identifiable natural person ('data subject'); an identifiable person is one who can be identified, directly or indirectly, in particular by reference to an identification number or to one or more factors specific to his physical, physiological, mental, economic, cultural or social identity." Common carriers also may be restricted from using personal information about their subscribers for marketing purposes. For example, the GLBA prohibits access to individually identifiable customer information, as well as the disclosure of location information, without the express prior authorization of the customer.

Thus, new technology for delivering targeted advertising in a wireless communication environment is desirable.

SUMMARY OF THE DISCLOSURE

In an exemplary embodiment, a method of receiving targeted content messages on a wireless access terminal (W-AT) includes selecting at least one message reception time based on a user profile and a message delivery schedule, and receiving at least a first targeted content message at the selected reception time via a wireless link.

In another exemplary embodiment, a W-AT configured to receive method of receiving targeted content messages includes a means for selecting at least one reception time based on a user profile and a targeted content message delivery schedule, and a means for receiving at least a first targeted content message at the selected reception time.

In another exemplary embodiment, a W-AT configured to receive method of receiving targeted content messages includes selection circuitry module configured to select at least one reception time based on a user profile and a targeted content message delivery schedule, receiving circuitry configured to receive at least a first targeted content message at the selected reception time.

In another exemplary embodiment, a computer program product includes a computer-readable medium that includes a first set of instructions for selecting at least one message reception time based on a user profile and a message delivery schedule, and a second set of instructions for receiving at least a first targeted content message at the selected reception time via a wireless link.

In another exemplary embodiment, one or more integrated circuits that together includes selection circuitry module configured to select at least one reception time based on a user profile and a targeted content message delivery schedule, and receiving circuitry configured to receive at least a first targeted content message at the selected reception time.

In another exemplary embodiment, an apparatus includes processing circuitry and a memory coupled to the processing circuitry that includes a first set of instructions for selecting at least one message reception time based on a user profile and a message delivery schedule, and a second set of instructions for receiving at least a first targeted content message at the selected reception time via a wireless link.

BRIEF DESCRIPTION OF THE DRAWINGS

The features and nature of the present disclosure will become more apparent from the detailed description set forth below when taken in conjunction with the drawings in which reference characters identify corresponding items and processes throughout.

FIG. 14 depicts a timeline for a first communication protocol for downloading targeted-message-sending content according to "contact windows" approach.

FIG. 15 depicts an alternate timeline for a communication protocol for downloading targeted-message-sending content according to a defined time schedule.

DETAILED DESCRIPTION

Figure 1:
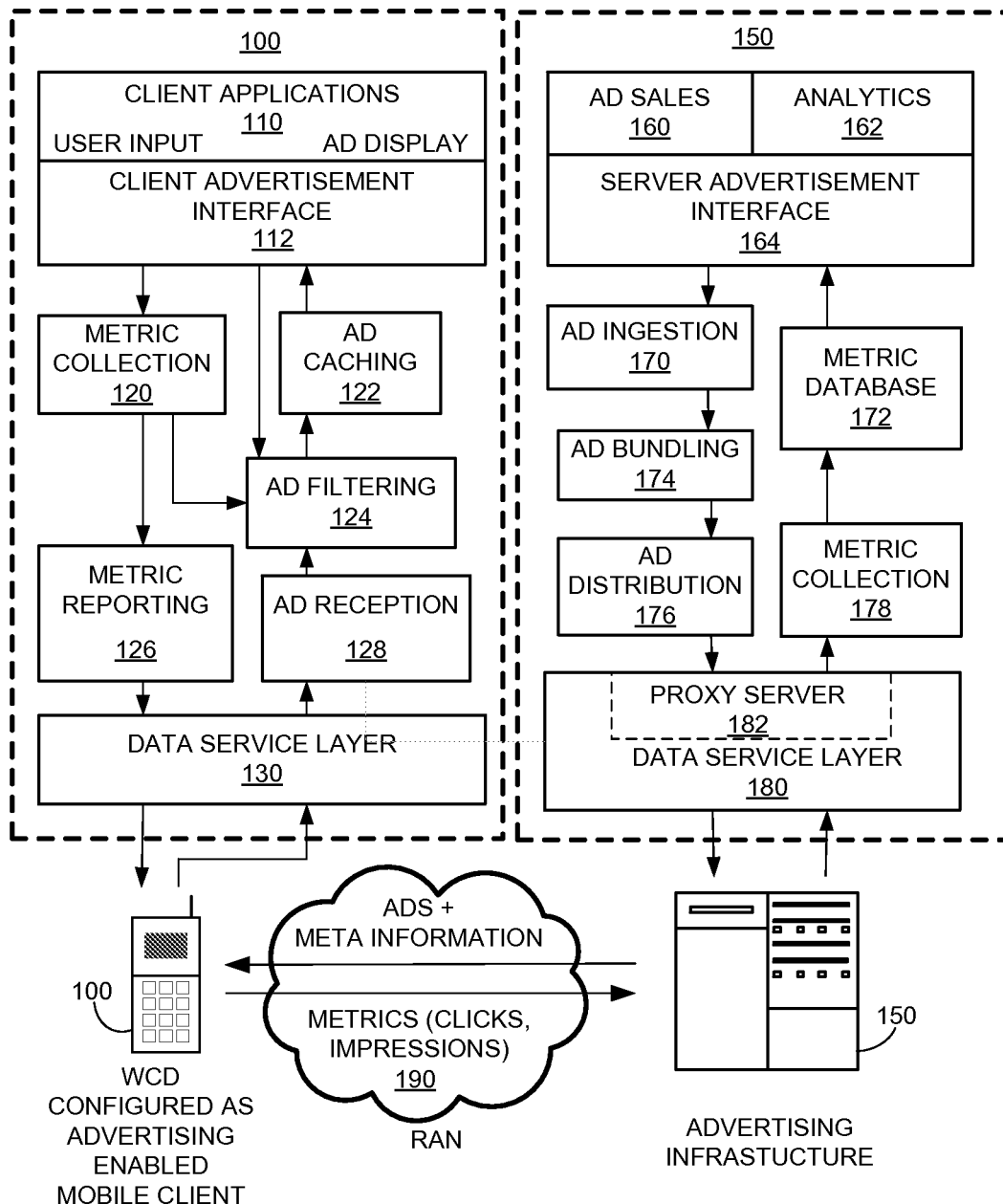
FIG. 1 is a diagram showing the interaction between an exemplary wireless access terminal (W-AT) and a targeted-message-sending infrastructure.

The terms and respective definitions/descriptions below are provided as a reference to the following disclosure. Note, however, that when applied to certain embodiments, some of the applied definitions/descriptions may be expanded or may otherwise differ with some of the specific language provided below as may be apparent to one of ordinary skill and in light of the particular circumstances.

TCM—Targeted-Content-Message. An advertisement can be an example of a Targeted-Content-Message.

M-TCM-PS—Mobile Targeted-Content-Message Processing System

MAS—Mobile advertising system.

UPG—User Profile Generation Agent

M-TCM-EC—Mobile TCM-Enabled Client

MAEC—Mobile advertising enabled client. This can be an example of a Mobile TCM-Enabled Client Mobile TCM Provider (M-TCM-P)—A person or an entity that may want to display a targeted-content-message through a targeted-content-message processing system.

Advertiser—A person or an entity that may want to display advertisements through a mobile advertising system (MAS). An advertiser may provide the advertisement data along with respective targeting and playback rules, which may in some instances form advertisement metadata to a MAS. An advertiser is an example of a Mobile TCM Provider.

TCM Metadata—A term used to identify data that can be used to provide additional information about a respective Targeted-Content-Message (TCM).

Advertisement Metadata—A term used to identify data that may be used to provide additional information about a respective advertisement. This may include, but is not limited to, mime type, advertisement duration, advertisement viewing start time, advertisement viewing end time, etc. Respective advertisement targeting and playback rules provided by the advertiser may also get attached to an advertisement as metadata for the advertisement. Advertisement Metadata is an example of TCM metadata.

Application Developer—A person who or an entity that develops an application for the mobile advertising enabled client (MAEC) that can feature advertisements.

System Operator—A person who or entity that operates a MAS.

Third Party Inference Rule Provider—A third party (other than a system operator) who may provide user profile inference rules to be used by a User Profile Generation Agent User Profile Generation Agent—A functional unit at the client that may receive various pertinent data, such as advertisement inference rules, user behavior from a metric collection agent, location data from a GPS, explicit user preferences entered by a user (if any) and/or user behavior from other client applications, then generate various user profile elements. A User Profile Generation Agent may continuously update a profile based upon information gathered that may be used to characterize user behavior.

User Behavior Synthesizer—A functional device or agent within a User Profile Generation Agent that may be used to receive a variety of data, such as user behavior information, location information and user profile inference rules to generate synthesized profile attributes.

Profile Element Refiner—A functional device or agent within a User Profile Generation Agent that may receive profile attributes generated by a user behavior synthesizer as well as a number of user profile inference rules. A Profile Element Refiner may refine profile attributes, process them through queries sent to a profile attribute processor, and generate user profile elements.

Profile Attribute Processor—A server and/or resident agent of a server that may process profile attribute requests that may require data-intensive lookups, and then respond with refined profile attributes.

TCM Filtering Agent—A client agent that may receiver a number of TCMs with their respective meta-data, TCM targeting rules and TCM filtering rules, then store some or all of the TCMs in a TCM-cache memory. The filtering agent may also take a user profile as input from the User Profile Generation Agent.

Advertisement Filtering Agent—A client agent that may receive a number of advertisements with their respective metadata, advertisement targeting rules and advertisement filter rules, then store some or all of the received advertisements in an advertisement cache memory. The filtering agent may also take a user profile as input from the User Profile Generation Agent. An advertising filtering agent is an example of a TCM filtering agent.

TCM Cache Manager—A client agent that can maintain a targeted content-message cache. A cache manager may take cached targeted content-messages from a filtering agent, and respond to content-message requests from other applications on the access terminal.

Advertisement Cache Manager—A client agent that can maintain an advertisement cache. A cache manager may take cached advertisements from a filtering agent and respond to advertisement requests from other applications on the access terminal. An advertisement cache manager is an example of a TCM cache manager.

User Profile Attributes—User behavior, interests, demographic information, and so on that may be synthesized by a user behavior synthesizer to form profile attributes, which may be viewed as intermediate pre-synthesized forms of data that may be further processed and refined by a profile element refiner into more refined user profile elements.

User Profile Elements—Items of information used to maintain a user profile, which may include various types of data useful to categorize or define the user's interests, behavior, demographic etc.

TCM Targeting Rules—These may include rules related to the presentation of a targeted-content-message specified by a Mobile TCM Provider.

Advertisement Targeting Rules—These may include rules specified by advertisers to impose rules/restrictions on how advertisements may be displayed and/or rules to target an advertisement towards a particular segment of users. They may be specific to a number of criteria, such as an advertisement campaign or advertisement group. Advertisement Targeting Rules are an example of TCM Targeting Rules.

TCM Playback Rules—These can include display rules specified by a client application while querying a TCM Cache Manager for TCMs to display in the context of their application.

Advertisement Playback Rules—These can include display rules specified by a client application while querying an Advertisement Cache Manager for advertisements to display in the context of their application. Advertisement Playback Rules are an example of TCM Playback Rules.

TCM Filter Rules—These can include rules upon which TCMs may be filtered. Typically, a system operator may specify these rules.

Advertisement Filter Rules—These can include rules upon which advertisements may be filtered. Typically, a system operator may specify these rules. Advertisement Filter Rules are an example of TCM-Filter-Rules.

User Profile Element Inference Rules—These can include rules, specified by a system operator (and/or a third party), that may be used to determine one or more processes usable to build a user profile from demographic and behavioral data.

TCM Telescoping—A display or presentation function for a TCM whereby additional presentation material may presented to a user in response to a user request.

Advertisement Telescoping—An advertisement display or presentation function whereby additional presentation material may presented to a user in response to a user request. Advertisement Telescoping is an example of TCM telescoping.

As mentioned above, various regulations regarding telecommunications and privacy can make targeted advertising difficult. However, the present disclosure can provide a variety of solutions to deliver targeted advertising to wireless access terminals (W-ATs), e.g., cellular phones, while paying attention to privacy concerns.

One of the many approaches of this disclosure used to alleviate privacy issues includes offloading a variety of processes onto a user's W-AT that may, in turn, be used to generate a set of information that likely characterizes the user, i.e., it can create a "user profile" of the user on the W-AT itself. Accordingly, targeted-content-messages, such as advertisements and other media, may be directed to the user's W-AT based on the user's profiles without exposing potentially sensitive customer information to the outside world.

The various disclosed methods and systems may be used in a Mobile TCM Processing System (M-TCM-PS) (and, in particular, in a Mobile Advertising System (MAS)), which for the present disclosure may include an end-to-end communication system usable to deliver targeted-content-messages (or in particular, advertisements) to TCM-Enabled W-ATs (or in particular Mobile Advertising Enabled W-ATs). A MAS may also provide an analytical interface capable of reporting on the performance of a particular advertisement campaign. Accordingly, an appropriately constructed MAS may provide a better consumer experience by presenting only non-intrusive advertisements that are likely to be of interest to consumers.

While the following examples are generally directed to content, such as commercial advertising, a broader scope of directed content is envisioned. For example, instead of directed advertisements, content such as stock reports, weather reports, religious information, news and sports information specific to a user's interests, and so on is envisioned within the bounds of this disclosure. For example, while directed content may be an advertisement, a score for a sports event and a weather report may just as easily be directed content. Accordingly, devices such as advertising servers may be viewed as more general content servers, and advertising-related agents and devices may be more generally thought of as content-related agents and servers. Information exchange between a TCM-enabled WAT and a content-related agent or server can be encrypted. All further discussion is provided in the context of advertisements as an example of a TCM (Targeted Content Message), and it should be noted that such discussion is applicable to Targeted-Content-Messages in general.

FIG. 1 is a diagram of some of the various functional elements of a MAS showing the interaction between an advertisement-enabled W-AT 100 with a communication network having an advertising infrastructure. As shown in FIG. 1, the exemplary MAS includes the advertisement-enabled mobile client/W-AT 100, a radio-enabled network (RAN) 190 and an advertising infrastructure 150 embedded in the network associated with the wireless WAN infrastructure (not shown in FIG. 1). For example, the advertising infrastructure could be available at a remote server not geographically co-located with a cellular base station in the wireless WAN.

As shown in FIG. 1, the W-AT can include a client applications device 110, a client advertisement interface 112, a metric collection agent 120, an ad caching manager 122, an ad filtering agent 124, a metric reporting agent 126, an advertisement reception agent 120 and a data service layer device 130. The advertising infrastructure 150 can include an advertisement sales agent 160, an analytics agent 162, a server advertisement interface 164, an advertisement ingestion agent 170, an advertisement bundling agent 174, an advertisement distribution agent 176, a metric database 172, a metric collection agent 178, and having a proxy server 182.

In operation, the "client side" of the MAS can be handled by the W-AT 100 (depicted on the left-hand side of FIG. 1). In addition to traditional applications associated with W-ATs, the present W-AT 100 may have advertisement-related applications at the applications level 110, which in turn may be linked to the rest of the MAS via a client advertisement interface 112. In various embodiments, the client advertisement interface 112 may provide for metrics/data collection and management. Some of the collected metrics/data may be transferred to the metric reporting agent 126 and/or to the W-AT's data service layer 130 (via the metric collection agent 120), without exposing individually identifiable customer information, for further distribution to the rest of the MAS.

The transferred metrics/data may be provided through the RAN 190 to the advertising infrastructure 150 (depicted on the right-hand side of FIG. 1), which for the present example includes a variety of advertising-related and privacy-protecting servers. The advertising infrastructure 150 can receive the metrics/data at a data service layer 180, which in turn may communicate the received metrics/data to a number of metrics/data collection servers (here metric collection agent 178) and/or software modules. The metrics/data may be stored in the metric database 172, and provided to the advertising server interface 164 where the stored metrics/data may be used for marketing purposes, e.g., advertising, sales and analytics. Note that information of interest may include, among other things, user selections at a W-AT and requests for advertisements executed by the W-AT in response to instructions provided by the advertising infrastructure 150.

The server advertisement interface 164 can provide a conduit for supplying advertisements (advertising ingestion), bundling advertisements, determining a distribution of advertisements and sending advertising through the data service layer 180 of the advertising infrastructure 150 to the rest of the MAS network. The advertising infrastructure 150 can provide the W-AT 100 with the advertisements, and metadata for advertisements. The W-AT 100 can be instructed by the advertising infrastructure 150 to select advertisements based on any available advertisement metadata according to rules provided by the advertising infrastructure.

As mentioned above, the exemplary W-AT 100 may be enabled to generate, in whole or in part, a user profile for the W-AT's user that, in turn, may be useful to enable the MAS to deliver targeted advertisements of likely interest to the user. This may result in better "click-through rates" for various advertisement campaigns. However, as mentioned above, generating a user profile may raise privacy concerns because of the potentially sensitive nature of data that may reside in the user profile.

Nevertheless, as will be shown below in the various MAS embodiments, privacy concerns may be alleviated by enabling a user's W-AT to generate a user profile while subsequently limiting the user profile to the confines of the user's W-AT except in very limited (and controlled) circumstances.

Figure 2:
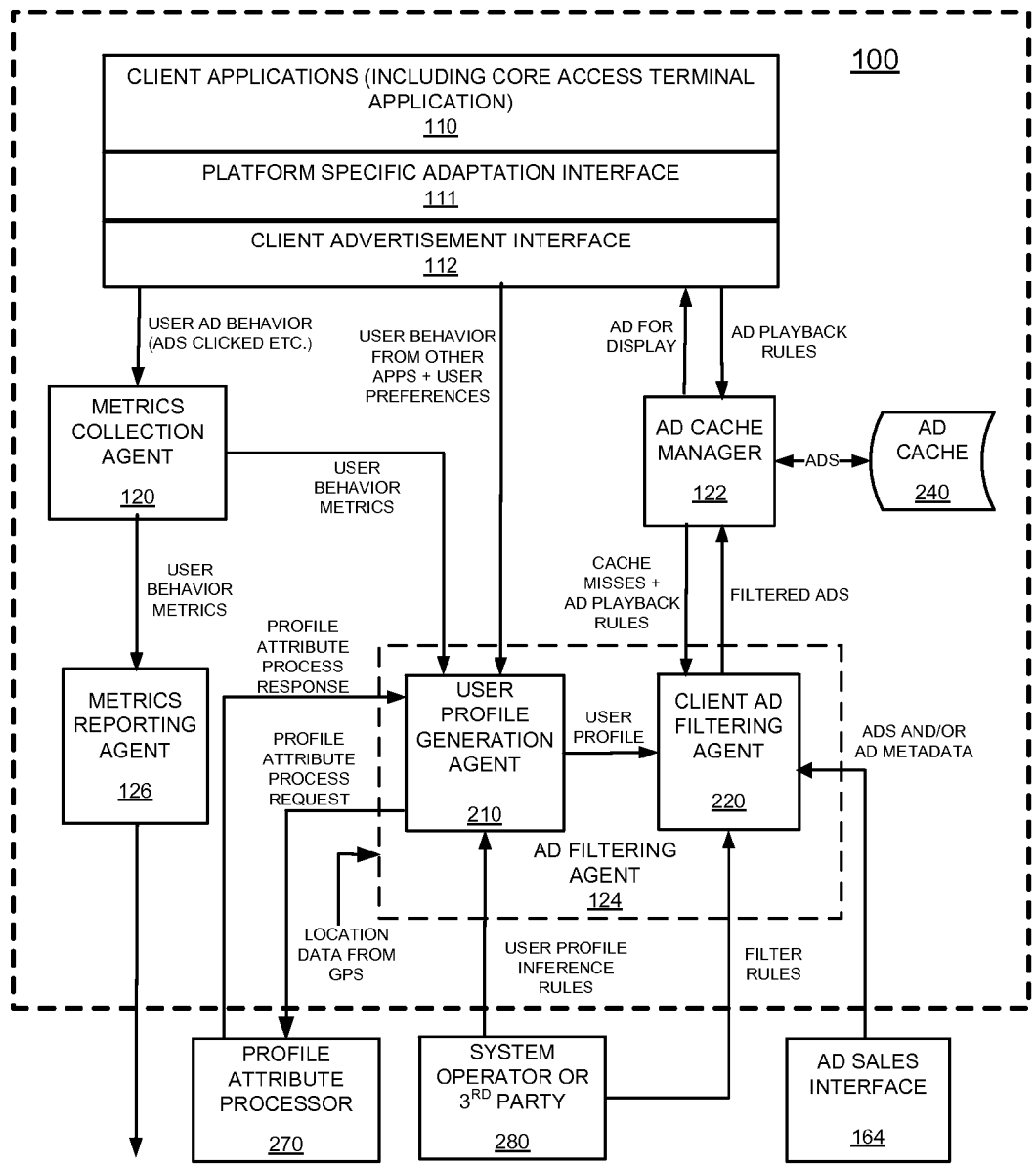
FIG. 2 is schematic block diagram showing the operation of an exemplary W-AT having an on-board user profile generation agent.

FIG. 2 is a block diagram showing operational details of the exemplary W-AT of FIG. 1 configured to generate and use a user profile. As shown in FIG. 2, the exemplary W-AT includes a processing system capable of processing a number of applications including a number of core client applications and a client advertising interface. Note that some components, such as the ad reception agent 128 and data service layer 130, are omitted from FIG. 2 for simplicity of explanation for the functions relevant to FIG. 2. The exemplary W-AT 100 of FIG. 2 is shown having a platform specific adaptation interface 111 between the client advertisement interface 112 and the client applications device 110, and an advertisement filtering agent 124 having a user profile generation agent 210 and a client advertisement filtering agent 220 responsive to the user profile generation agent 210. An advertisement cache memory 240 is shown in communication with the advertisement cache manager 122. External devices, e.g., profile attribute processor 270, system operator (or $3^{rd}$ party) 280 and advertisement sales interface 164, are shown in communication with the advertisement filtering agent 124. Devices 270, 280 and 164 are generally not part of a W-AT, but likely to reside in another portion of a MAS network.

While the various components 110-240 of the W-AT 100 are depicted as separate functional blocks, it should be appreciated that each of these functional blocks may take a variety of forms including separate pieces of dedicated logic, separate processors running separate pieces of software/firmware, collections of software/firmware residing in a memory and being operated upon by a single processor, and so on.

In operation, the client applications device 110 may perform any number of functional applications useful for telecommunications (e.g., calls and text messaging) or other tasks (e.g., games) using the platform specific adaptation interface 111 to interface with the client advertisement interface. The client advertisement interface 112, in turn, can be used to allow the W-AT 100 to perform a number of useful processes, such as monitor user behavior and pass user-related information to the user profile generation agent 210.

In addition to receiving information directly from the client applications interface, the user profile generation agent 210 may accrue user behavior information from the metrics collection agent 120, which itself may receive the same or different information from the client advertisement interface 112. Examples of user behavior may include advertising-related responses, such as advertisement clicks and other metrics indicating types and frequency of usage. Other user behavior information may include direct user preferences or authorizations.

The metrics collection agent 120 may provide metrics/data to the metrics reporting agent 126, which in turn may provide the metrics/data information to other components of MAS (discussed below) that may be internal or external to a W-AT.

The profile attribute processor 270 can process incoming profile attribute processing requests from the W-AT 100 that require (or can otherwise benefit from) data-intensive lookups and respond with refined profile attributes to the user profile generation agent 210.

One function of the user profile generation agent 210 may include providing user profile information to the client advertisement filtering agent 220, which may determine advertisements that may be provided to the W-AT's user in accordance with relevant filter rules, as well as advertisement data and advertisement metadata from the advertising sales interface 164. The advertisement filtering agent 220 may also provide filtered advertisements to the advertisement cache manager 122, which in turn may store and later provide such advertisements (via advertisement cache memory 240) for presentation to the user.

A user profile generation agent can be any collection of hardware and/or software residing in a Mobile Advertising Enabled W-AT that can be used to collect user behavior information. Potential information sources may include, but are not limited to, applications residing on the user's W-AT, public information available in various accessible databases, previous user responses to advertisements, location data from a resident GPS radio and explicit user preferences entered by the user (if any). Any user profile information gathered may then be processed/synthesized to generate user profile attributes or elements, which may better characterize the user while using less memory resources.

In various embodiments, user profile inference rules provided by a system operator (and/or a third party) may drive the particular actions of a W-AT's user profile generation agent. Note that these rules may be of a number of types, including: (1) Basic Rules, which include actions to be performed by a user profile generation agent on a predetermined schedule associated with each action; and (2) Qualified Rules, which include "action(s)" that are qualified by a "condition", where the "condition" may define a behavior that needs to be true, and the "action" may define an action taken by a rule engine of the user profile generation agent when the condition is detected to be true. Such rules may be useful in inferring information from specific user actions or behavior.

For example, a simple rule for a user profile generation agent might be to store GPS derived location information for the user's W-AT every five minutes. An associated rule could be that the location most frequented within a 09:00-17:00 time range in the day be marked as the user's likely work location.

By way of a second example, a rule qualified by a condition might be to add a "game" category to the user's list of interests if the user often spends more than 30 minutes a day in the gaming applications on his W-AT.

Also note that the user profile generation agent may also take as input user preferences including user selection concerning express authorization of the user to derive a profile using location data, other authorizations made by the user and other specific information entered by the user. E.g. the user might input his preference to view travel related advertisements.

Various rule-driven approaches incorporated in a user's W-AT usable to gather and refine/categorize behavior data may alleviate some of the privacy concerns users might have. For example, by mining data and synthesizing raw data into more meaningful/useful forms within the W-AT (as opposed to using an external server), sensitive or personal information can be developed and later used for targeted advertising without exposing this information to the rest of the W-AT's communication network.

In various embodiments, particular aspects of a user's profile may control portions of the user's W-AT. For example, a user profile generation agent may utilize any retrieved W-AT information to tailor information content in a manner best suited for the W-AT, including the choice of menu layout, such as linear, hierarchical, animated, popup and softkeys.

As mentioned above, while most profile generation rules can be interpreted by the W-AT's embedded user profile generation agent, there might be some rules that require large database lookups, e.g., government census data. Since memory on the W-AT may be too limited to accommodate large databases, it may be possible to further refine the already synthesized user behavior and demographic data by offloading the appropriate refinement tasks to a specially configured server at the W-AP side of the MAS network. For the present disclosure, any such external server capable of assisting in user profile generation may be referred to as a "profile attribute processor." Additional discussion of profile attribute processors is provided below with respect to FIG. 4.

Figure 3:
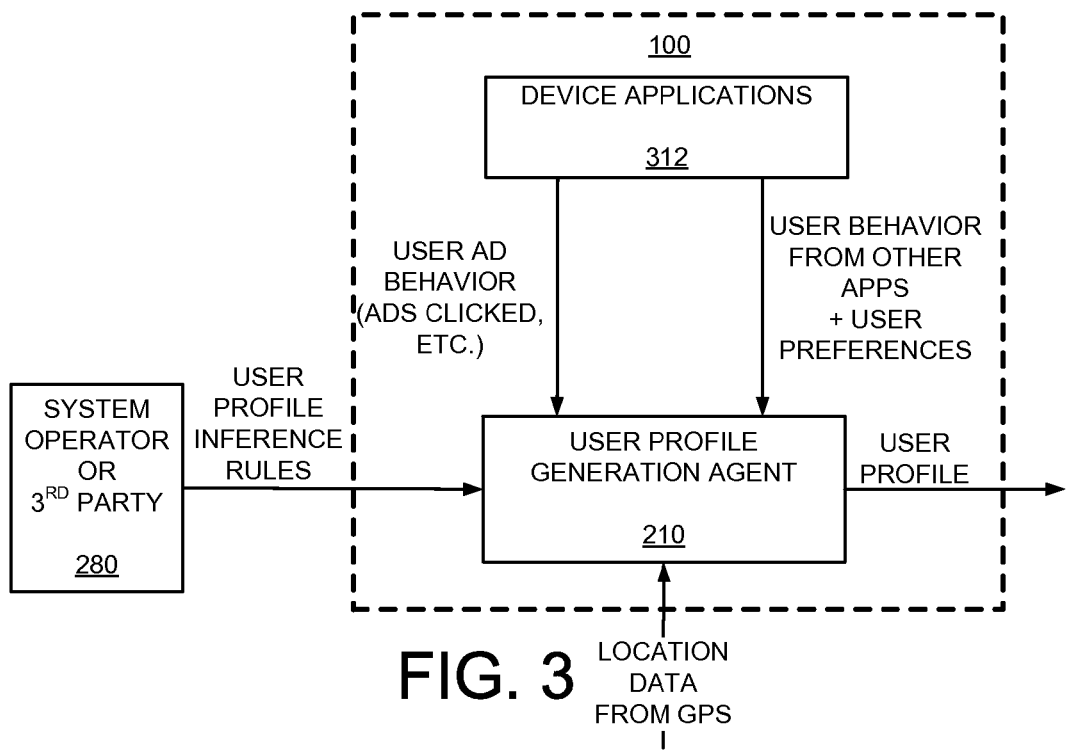
FIG. 3 is a schematic block diagram showing an exemplary operation of a data transfer of a user profile generation agent.

FIG. 3 is a schematic block diagram of the previously presented user profile generation agent 210 shown in the context of interacting with other devices 312 and 280. Various capabilities of the user profile generation agent 210 (in addition to those discussed above) are provided in part below.

One of the features of a mobile phone is that it can be carried by a user wherever he/she goes. Utilizing the GPS capabilities of a W-AT, the W-AT can determine where the user is periodically or a-periodically spending some or most of his/her time. As there is often demographic data associated with locations, the use of GPS information and demographic data associated with locations that the user frequents may allow the development of at least some portions of a demographic profile associated with the user. Typical demographic profile elements associated with the user's profile using the location information may include, but are not limited to:

Location ZIP code
Gender
Median age for the frequented location
Age distribution and associated probability
Mean travel time to work
Household income or household income range
Household size
Family income or family income range
Family size
Marital status
Probability of owning a house
Probability of renting a house
Life-stage group/classification Note that multiple demographic user profiles can be maintained at the W-AT for the user. For example, the Mobile Advertising Enabled Client might be configured by the network to maintain two demographic profiles for the user—one for his "home" location (most frequented location between, say, 21:00-06:00) and one for his "work" location (most frequented location between, say 09:00-17:00).

In addition to general demographics, a user profile may be further developed using any of a W-AT's numerous applications. Which applications, e.g., games, a user tends to spend most of his time with or how he interacts with the various applications on the phone may provide an opportunity to build a profile for the user based on his behavior and preferences. Most of the data mining and user behavior profile determination of this sort can be done on the W-AT itself, being driven by user profile inference rules fed to the user profile generation agent 210. Typical behavioral profile elements associated with a user may include, but are not limited to, the following:

Application ID and time spent in the application
Interest categorization
Favorite keywords
Favorite websites
Advertisements of interest
Music album
Games of interest Many profile elements (including demographics) can be inferred from behavior mined by adding hooks to observe application behavior through a native user interface application on a W-AT. It is through such applications that the user may launch other applications. Applications of interest to the user and time spent in these applications can be inferred by monitoring when the user launches and exits a particular application.

Rules fed to the user profile generation agent 210 can associate interest categories for a user based on the user's interactions with applications. Interest categories can also be assigned to the user profile using server assisted collaborative filtering on the behavior data collected at the W-AT.

Rules that may get downloaded to the user profile generation agent 210 may allow a server to control the functioning of the user profile generation agent 210 in a dynamic fashion. By mining raw data on the incumbent W-AT and synthesizing it into more meaningful information (profile attributes), particular sensitive user behavior information can be transformed into advertisement behavior categories and user profile elements versus maintaining data in raw form.

An exemplary W-AT can keep track of the advertisements of interest to the user and the keywords associated with such advertisements. Multiple clicks on the same advertisement may indicate to a user profile agent an interest level associated with the associated keywords and advertisement. On the same lines, games and music of interest to the user can be maintained at the W-AT. Server-assisted mode can also be used to associate user interest categories with the user's profile based on the user's music and game play-lists.

As a user profile is developed and maintained, such a profile can take a variety of forms, e.g., synthesized profile attributes and elements.

Note that some or all data attributes and elements in a user profile may have some confidence level associated with them. That is, because certain elements and attributes are based upon inferences and rules, their results may not be certain and have "fuzziness" associated with them. This fuzziness may be expressed as a confidence level associated with a user profile attribute and element.

By way of example, noting that a user is sending more that five-hundred SMS messages per month, the profile generator might say that the user is likely to be in the age group from 15-24 with a confidence level of 60%. That means that if 100 users sending more than five-hundred SMS messages per month were to be polled for their age, about 60 of them are likely to fall within the age group of 15-24.

Similarly, when a demographic profile is inferred for a user based on his/her home location, there may be a confidence level associated with the profile attributes. The confidence level here may indicate the number of times the profile attribute is expected to be accurate in a sample of one-hundred users with the same home location.

The exemplary user profile generation agent 210 can also be fed rules to combine confidence levels on the same profile attribute from multiple sources to come up with a unified confidence level for the attribute. For example, if the SMS usage rate indicates that the user is within the age group of 15-24 years with a 60% confidence level and demographic profile for the home location indicates that the user is in age group of 15-24 years with a 20% confidence level, then these two items can be combined with fuzzy logic rules to come up with a unified confidence level for the user lying in the same age group.

In contrast, if a user enters his interest preferences into the client, then such values might be given a confidence level of close to 100% since they are coming directly from the user. Similarly if the carrier specifies any user profile attributes/elements based on the user data it has (billing data or optional profile data collected from the user during service sign-up), then that too will have a higher confidence level associated with it.

As more user behavior data is collected on a W-AT and inferences made based on that, subsequent confidence level, in the profile attribute and element values, is expected to increase.

Figure 4:
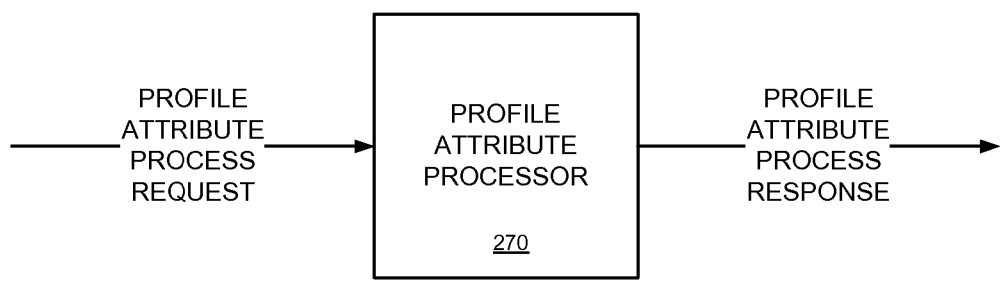
FIG. 4 is a schematic block diagram handling an exemplary request for profile data processing.

FIG. 4 is a schematic block diagram for a profile attribute processor 270 handling a request by a W-AT for profile attribute processing. As discussed above, while a W-AT may be able to handle most processing, there may be cases where huge database lookups are required to determine portions of a behavior or demographic profile. An example of such cases includes instances where census databases, which may require gigabytes of storage, are useful. Accordingly, a profile attribute processor (or other assisting server) may be used to process user information to provide more refined forms of user profile information.

Before a request is received by a profile attribute processor 270, synthesized profile attributes may be gathered at the relevant W-AT, and sent to the profile attribute processor 270 noting that the use of synthesized profile attributes can result in better use of bandwidth. Some of the user profile attributes, which require data-intensive lookups, can be processed by the profile attribute processor 270 optionally by anonymously querying techniques to protect user identities. The profile attribute processor 270 may further refine any received attributes, and provide the refined data to the appropriate W-AT in what may be referred to as a set of refined user profile attributes.

Figure 8:
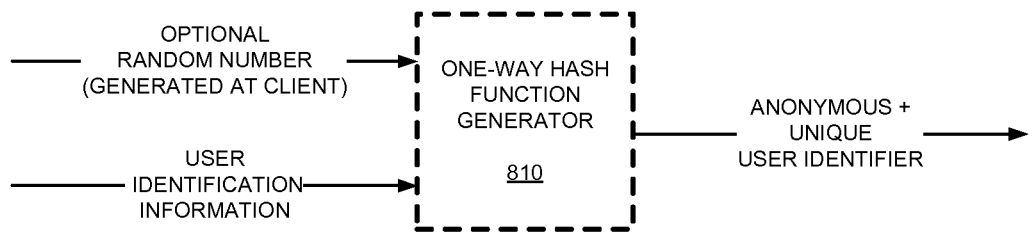
FIG. 8 is a diagram illustrating the use of a one-way hash function for client identity protection when identifiable data is transferred to a mobile targeted-message-sending server. A targeted-message-sending server is an example of mobile targeted-content-message processing server.

When activated by a request from a W-AT, the profile attribute processor 270 may process various types of specific and non-specific synthesized data regarding a user's behavior and demographics (e.g., profile attributes) and respond with the appropriate refined profile information. In order to maintain user privacy, some form of data scrambling, e.g., a hashing function and a number of other tools may be employed via a device, such as the one-way hash function generator 810 of FIG. 8. In operation, it is possible to use a hash function at a W-AT to hide the user's identity from the rest of the MAS network.

In various operations, a hashing function employed in a W-AT can generate a predictable and unique, but anonymous, value associated with a particular user. Such an approach can enable the W-AT to query external servers without compromising on the privacy of the user. In various embodiments, a hashing function may be based on a primary identifier of the W-AT, e.g. a serial number associated with the W-AT, as well as a random value, a pseudo-random value, and a time-based value. Further, the hashing function may be calculated to provide a low probability of collision with other generated values.

The W-AT may use the same random number for subsequent queries to allow external servers to associate multiple queries from the same client. The use of the random number can help to prevent external servers (or unauthorized agents) from doing a reverse lookup on a subscriber base to determine a user's identity.

Once a hashed value is generated, the hashed value may be used as an alternate user identifier for the W-AT and provided, along with geographic information or some or items of information from a user profile, and provided to a remote apparatus.

Subsequently, one or more targeted content messages can be received from the remote apparatus based on the alternate user identifier and first advertisement-related information to the remote apparatus and/or other information capable of supplementing a user profile. Such information can be incorporated into the user profile of the W-AT.

Figure 9:
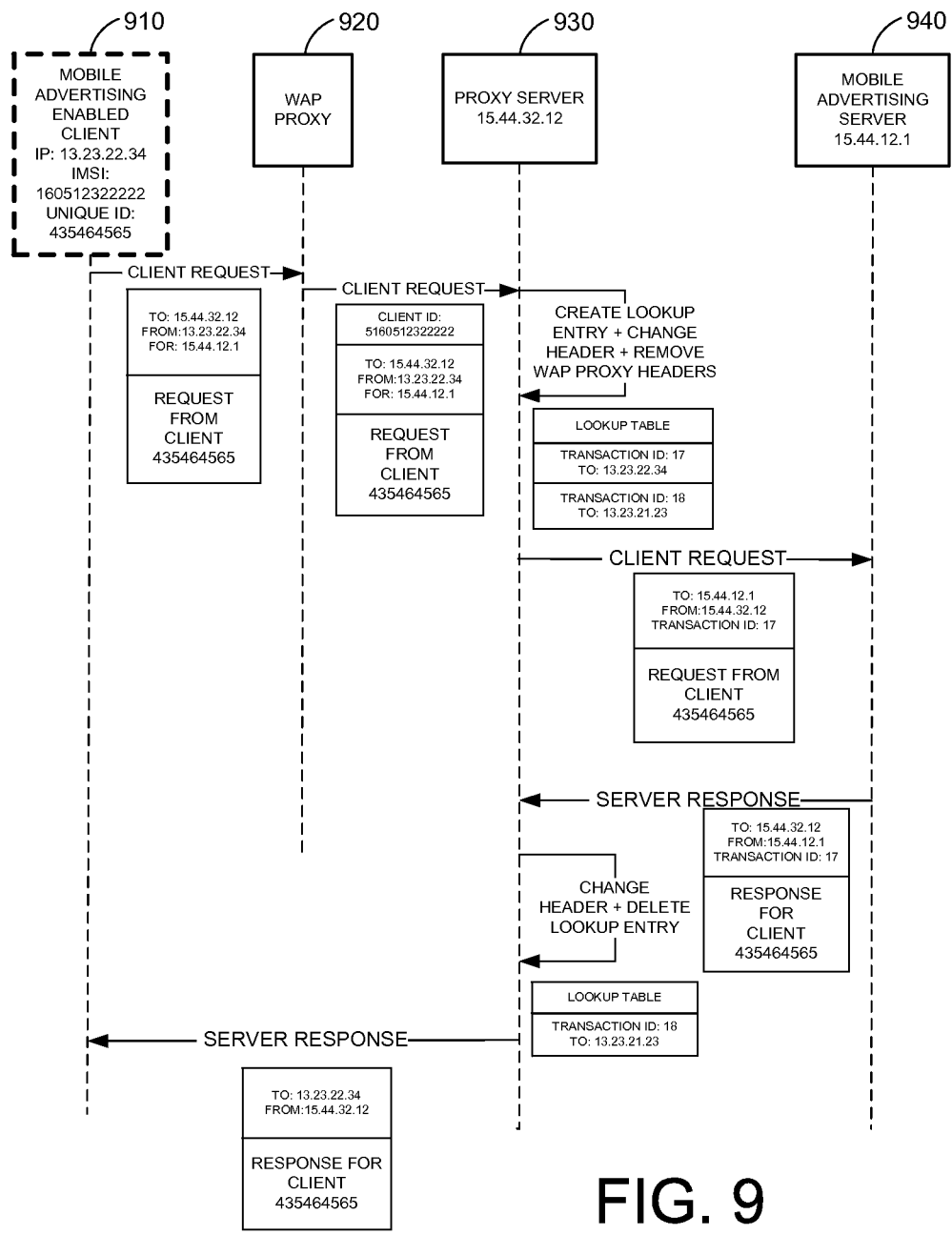
FIG. 9 is a diagram illustrating data flow implemented by a proxy server for anonymizing identifiable data transferred to a mobile targeted-message-sending server.

In order to further maintain user privacy, a proxy server at the wireless access point (W-AP) side (see, e.g., FIG. 1) may be used. FIG. 9 depicts a particular communication scheme employing a proxy server for securely communicating in a mobile advertising-enabled network. As shown in FIG. 9, a W-AT 910 (the "Mobile Advertising-Enabled Client") can send a request (or other message, such as a report or reply) related to a number of services, such as for refinement of user profile information or a request for advertising content, to a wireless application protocol (WAP) proxy 920. The WAP proxy 920, in turn, can forward the request to a secure proxy server 930, which may then create a transaction ID, change out the header to remove the W-AT's identification information in favor of the transaction ID, and forward the request to a mobile advertising server 940 while creating a look-up table containing that information, e.g., the W-AT's IP address, useful to relay a reply.

Once the mobile advertising server 940 receives and replies to the request, the proxy server 930 may use the appropriate transaction ID to forward the mobile advertising server's reply. Later, the proxy server 930 may delete the look up table entry.

Note that the scheme depicted in FIG. 9 can be employed to disallow the mobile advertising server 940 access to the user's W-AT IP address.

In order to alleviate concerns of users that their location is possibly being tracked in real-time by their W-ATs, the W-ATs may elect not to query the server for refinement of location data in real-time. Note that such queries can be sent anonymously and sparsely over an extended period of time (e.g., once a month). A typical schedule could be, for example, to collect location information every 5 minutes for 72 hours. The most frequented location during this time frame or during specific time frames can be used to query the demographic profile of the user from the server at a randomly selected time between 30 and 40 days or by some other schedule specified by a the system operator.

The above case is an example of a hybrid approach using both the rule driven operation of the user profile generation agent along with the server-assisted mode to generate profile elements for the user while maintaining the user's privacy.

Figure 5:
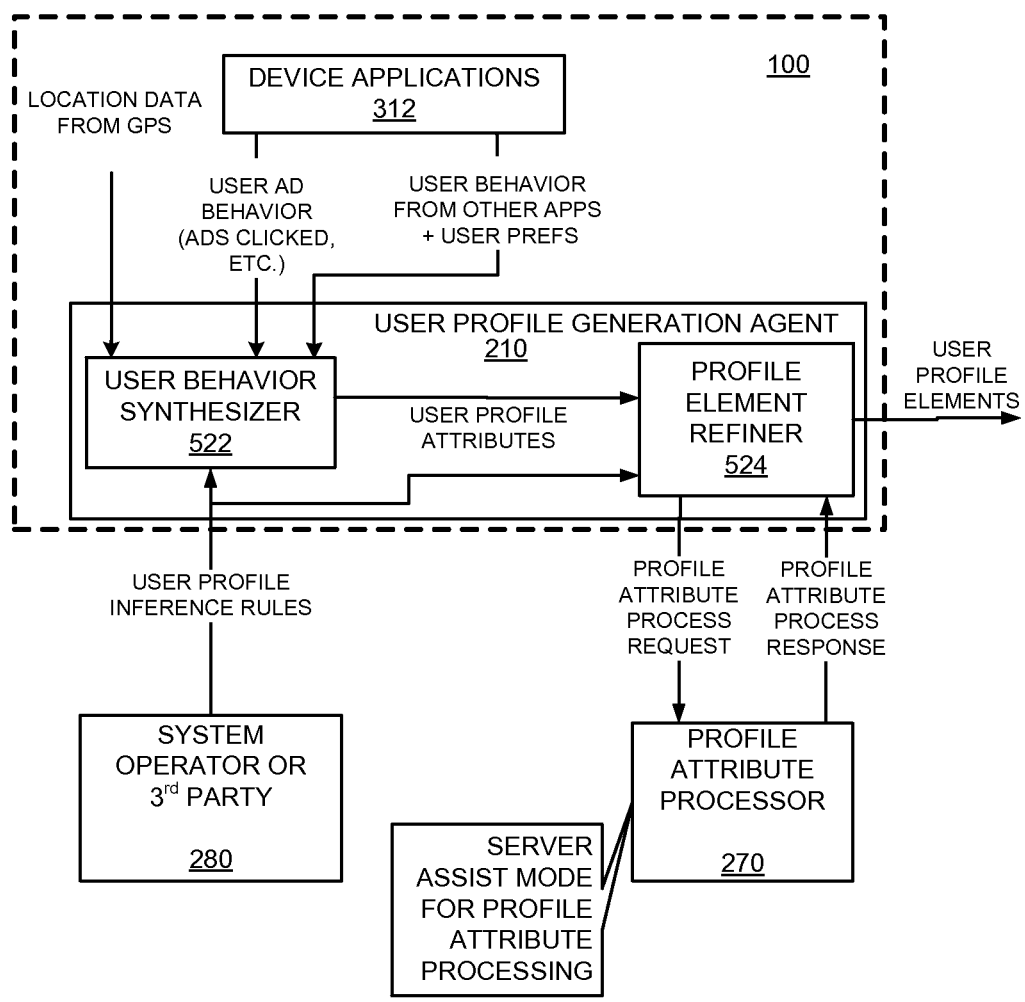
FIG. 5 is a schematic block diagram showing an exemplary operation of a user profile generation agent.

FIG. 5 is a schematic block diagram shown depicting an exemplary operation of such a hybrid approach using a user profile generation agent 210 having a user behavior synthesizer 522 and a profile element refiner 524. While the majority of functionality of the various devices of FIG. 5 has already been discussed above, further functionality will be described below with respect to the following flowcharts.

Figure 6:
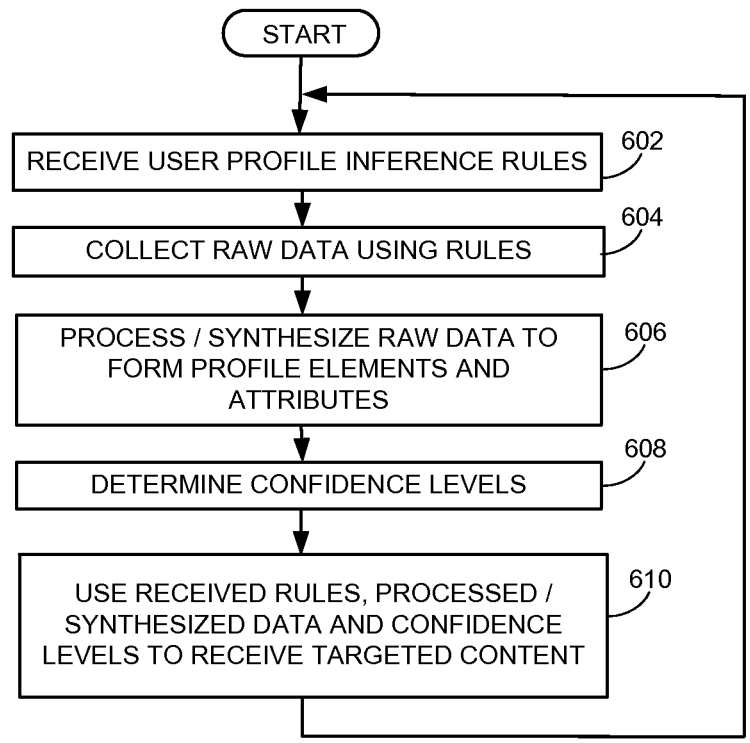
FIG. 6 is a flowchart outlining an exemplary operation for generating and using a user profile.

FIG. 6 is a flowchart outlining an exemplary operation for generating and using a user profile. The operation starts in step 602 as a number of user profile inference rules (basic and/or qualified rules) can be received (and subsequently stored) by a W-AT from a system operator or other party.

As discussed above, basic rules may include pre-scheduled events, e.g., performing a query of the user at a specific time. Similarly, a respective qualified rule might require the same query to be preceded by a condition and/or event, such as physical status information or operational status information.

Next, in step 604, the received rules can be used to collect raw data, and in step 606 the raw data may be processed/synthesized into user profile elements or attributes noting that while all such processing/synthesizing may occur on board the W-AT, some refinement may occur using external devices, such as the profile attribute processors discussed above. That is, as discussed above raw data and/or synthesized data may be incorporated to form a user profile for the W-AT's user. For example, a rule relating to monitoring SMS messages may be used to change a dynamic property of a user profile when applied to collect raw data and synthesize profile attributes/elements regarding SMS messages. Static data, e.g., a user's birth date, may be likewise collected using a rule to query the user, and then applied as an element in a user profile.

Then, in step 608, confidence levels for user profile data can be determined. Note that confidence levels can have a variety of forms, such as a range of numbers, variance statistic, or distribution profile.

In step 610, various received rules plus raw data and synthesized data relating to various user profile elements and attributes, which may form all of a user profile, may be used to receive targeted advertisements. That is, as discussed above, in various embodiments a used/usable rule on a W-AT may be used to generate a user profile—along with collected raw data and synthesized data—to provide any number of static or dynamic properties of the user profile, and such information may be used to receive content, such as advertisements, sports scores, weather reports and news directed to subjects of likely interest.

Note that in various embodiments where user profile data can have confidence levels associated with them, rules may be applied to the confidence levels and targeted content messages may be received and displayed based on such confidence information.

Continuing, control of the operation may jump back to step 602 where new/more rules may be received and used to collect data and modify the user's profile.

Note that, as referenced above rules may be used based on physical configuration of an W-AT so as to utilize W-AT information to tailor content display in a manner suited for the W-AT to create suitable displays, such as menu layouts having linear, hierarchical, animated, popup and/or softkey attributes.

Figure 7:
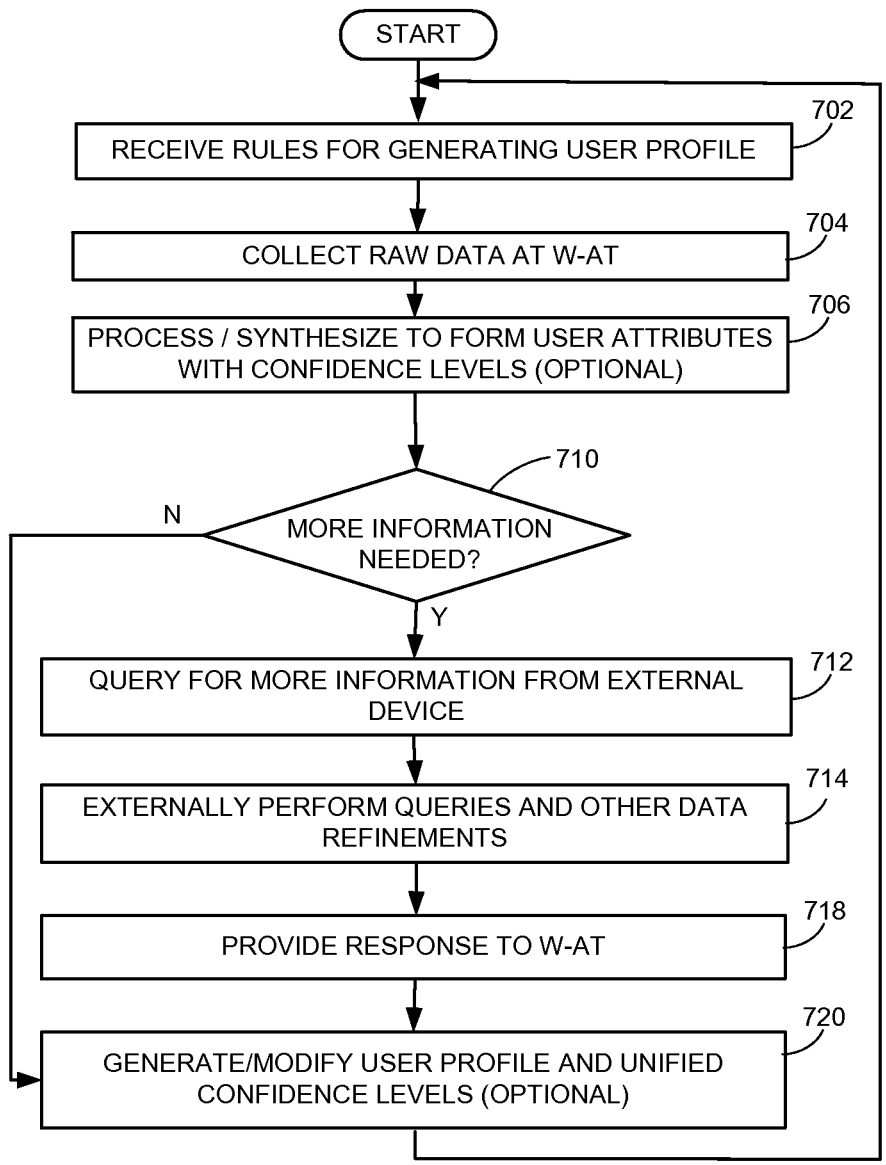
FIG. 7 is a flowchart outlining another exemplary operation for generating and using a user profile.

FIG. 7 is a flowchart outlining another exemplary operation for generating and using a user profile. The operation starts in step 702 as a number of user profile inference rules are received by a W-AT from a system operator or other party. Next, in step 704, the received rules can be used to collect raw data, and in step 706 the raw data may be processed/synthesized into user profile elements or attributes using onboard resources. Again note that any item of user profile information may have confidence level information processed and synthesized along with the basic data.

Continuing to step 710, a determination may be made as to whether further information or processing is required that may not be practical on a W-AT. For example, assuming that a W-AT has accrued a series of locations for which the W-AT regularly has visited using a GPS, a software agent on the W-AT using one or more rules may determine the need to query a large external database, such as a geographic information service or a national census database on a remote server, to determine a likely ethnicity (or other demographics) of the user. If further information or processing is required, control continues to step 712; otherwise, control of the operation may jump back to the step 720 where profile attributes are used to generate/modify the user's profile.

For instances where further information or processing is required, a request may be made of an external device (step 712), such as by the profile attribute processor discussed above (optionally using hashing functions and/or proxy servers) to protect user information.

Next, in step 714, the external device can perform any number of refinement steps, such as query large databases, to produce refined user profile attributes. Then, in step 718, refined user profile attributes may then be provided to the appropriate W-AT, where (in step 720) they may be used to generate, modify or otherwise incorporated in a user profile. Note that when confidence levels are available for processing, unified confidence levels may be determined based on individual confidence levels. Control of the operation may then jump back to the step 702 where new/more rules may be received and used to collect data and modify the user's profile.

Figure 10:
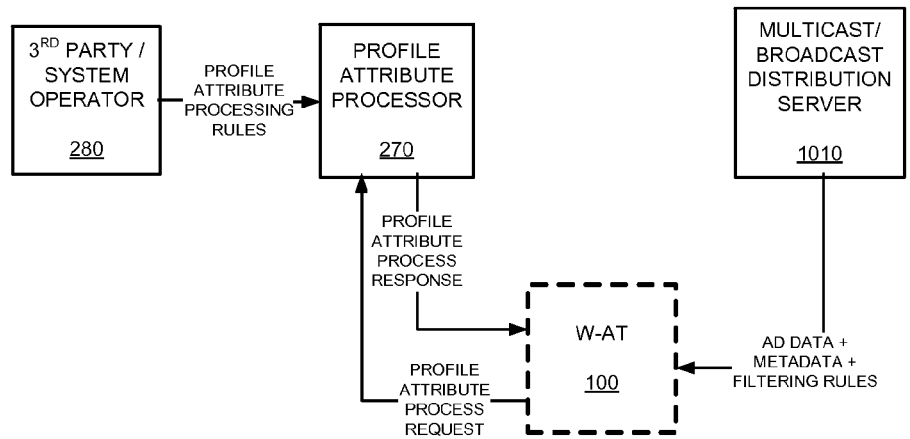
FIG. 10 depicts a communication protocol for content distribution in a mobile targeted-message-sending-enabled network.

Jumping forward to FIG. 10, a first communication protocol for advertisement distribution in a mobile advertising-enabled network is depicted. This exemplary figure illustrates a possible data flow during a multicast "push" of advertisements from an ad server. Note that the User Profile Generation Agent (in the Mobile Device (W-AT) 100 of FIG. 10) can retrieve advertisements, then and select one or more of the received the advertisements by internal filtering.

In operation, a network system operator 280 (and/or a third party) may provide profile attribute processing rules to the profile attribute processor 270. The profile attribute processor 270 may also receive a profile attribute process request from modules on the W-AT 100 and provide an appropriate response through modules on the W-AT 100.

Additionally, multicast or broadcast advertisements may be received by the W-AT 100. In this configuration, the W-AT 100 (or other Mobile Device) can be able to receive all advertisements and determine which advertisements are to be stored and presented to the user in accordance with the user profile generated at the W-AT 100 and the filter rules also received from an ad server, such as the multicast/broadcast distribution server 1010 of FIG. 10.

Figure 11:
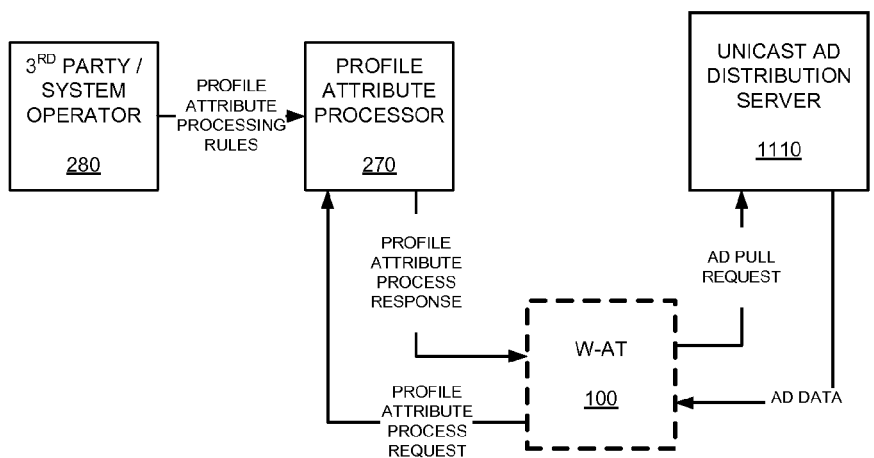
FIG. 11 depicts another communication protocol for content distribution in a mobile targeted-message-sending-enabled network.

FIG. 11 depicts a second communication protocol for advertisement distribution in a mobile advertising-enabled network. As with the example of FIG. 10, a network system operator 280 (and/or a third party) may provide profile attribute processing rules to the profile attribute processor 270, and the profile attribute processor 270 may also receive a profile attribute process request from modules on the W-AT 100 to provide an appropriate response through modules on the W-AT 100.

However, in this embodiment unicast advertisements may be requested by the W-AT 100 from the ad distribution server 1110. The W-AT 100 may be able to receive all advertisements over a unicast communication link and determine which advertisements are to be stored and presented to the user in accordance with the user profile generated at the W-AT 100 and the filter rules also received from the ad server 1110.

Figure 12:
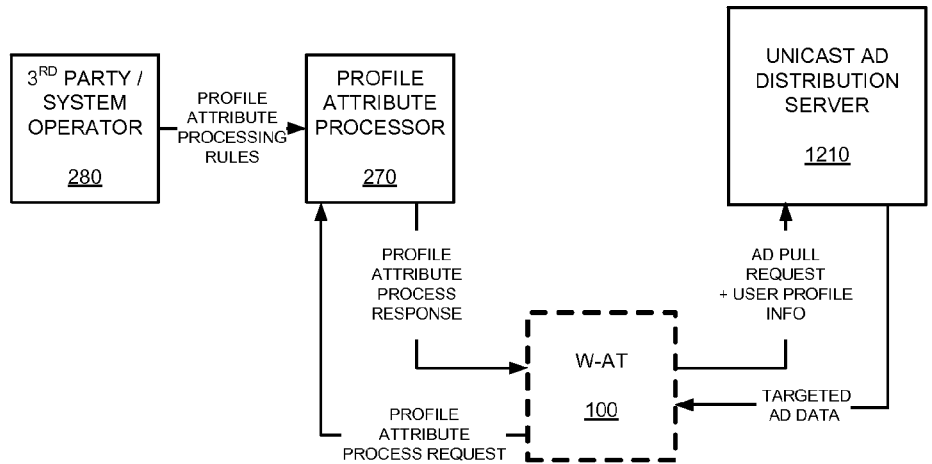
FIG. 12 depicts another communication protocol for content distribution in a mobile targeted-message-sending-enabled network.

FIG. 12 depicts a third communication protocol for advertisement distribution in a mobile advertising-enabled network. Again, as with the previous examples, a network system operator 280 (and/or a third party) may provide profile attribute processing rules to the profile attribute processor 270, and the profile attribute processor 270 may also receive a profile attribute process request from modules on the W-AT 100 to provide an appropriate response through modules on the W-AT 100.

However, in this embodiment, the ad distribution server 1210 may receive user profile information provided by the W-AT 100, process the received user profile information, and then provide the appropriate targeted ads to the W-AT 100.

Figure 13:
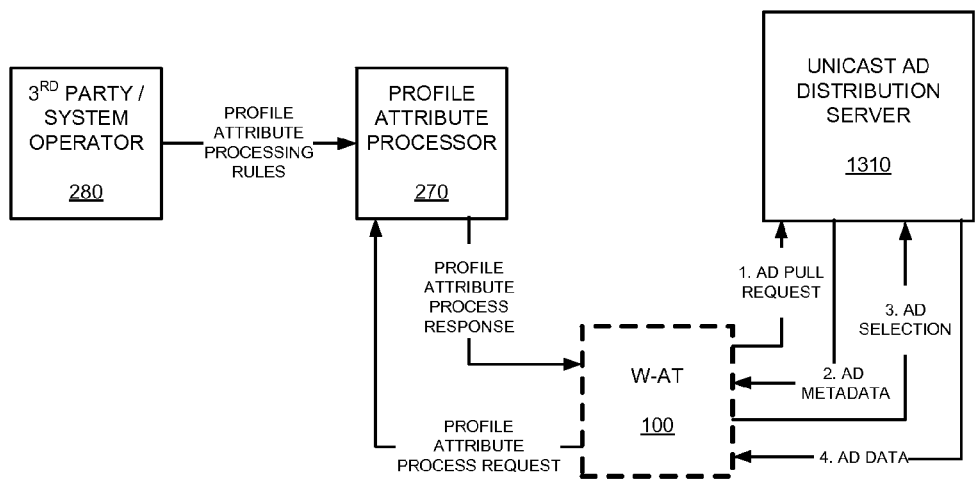
FIG. 13 depicts another communication protocol for content distribution in a mobile targeted-message-sending-enabled network.

FIG. 13 depicts a fourth communication protocol for advertisement distribution in a mobile advertising-enabled network. This example may work much the same as the previous examples with respect to the profile attribute processor side of operation. However, the ad retrieval over the unicast communication link is substantially different.

In operation, the W-AT 100 may send a request for advertisements where after the W-AT 100 can receive a set of metadata representative of the various advertisements available in the ad distribution server 1310. The W-AT 100 may then select a number of advertisements based on the metadata and on the filtering rules within the W-AT 100, and provide the selection information to the ad distribution server 1310. Accordingly, the selected advertisements can then be provided to the W-AT 100 and presented to the user in accordance with the user profile rules.

The above approach keeps the user profile local on the W-AT while using optimal network bandwidth when delivering advertisements to the W-AT over the unicast communication link.

FIG. 14 depicts a timeline for a first communication protocol for downloading advertising content according to "contact windows" (see exemplary windows 1410-1416) approach. This may be used to permit downloading of advertisements at an opportune time without burdening other functions of the W-AT. In various embodiments, the W-AT may be able to adjust its sleep mode, if engaged, to the contact windows. In operation, a W-AT can be put into a sleep mode to optimize energy consumption on the platform during content message delivery. It is possible that in a sleep mode, the W-AT may be engaged in other useful operations. That is, a W-AT may be able to be put into a sleep mode while various timing circuitry (not shown) may be programmed or otherwise manipulated to respond to the sleep mode and a contact window or other schedule by dis-engaging the sleep mode before/during the contact window, and possible re-engaging sleep mode subsequent to receiving targeted content messages or at the end of the relative contact window.

FIG. 15 depicts an alternate timeline for a first communication protocol for downloading advertising or other targeted-content-message information according to a defined time schedule. See, exemplary windows 1510-1520. This approach may be used to permit downloading of advertisements at an opportune time without burdening other functions of the W-AT. The defined time schedule permits the W-AT to remain in sleep mode except during the defined time schedule. Again, various timing/clock circuitry may be employed to engage and dis-engage a W-AT to/from sleep mode. Additionally, it is possible that when the W-AT wakes up to receive targeted-content-message information, it can receive targeting meta-data and reception times for future targeted-content-messages, which can then be used to determine whether to receive a future targeted-content-message based on the user profile and the targeting meta-data, and to schedule an appropriate wakeup time prior to the reception time for a future targeted-content-message.

The techniques and modules described herein may be implemented by various means. For example, these techniques may be implemented in hardware, software, or a combination thereof. For a hardware implementation, the processing units within an access point or an access terminal may be implemented within one or more application specific integrated circuits (ASICs), digital signal processors (DSPs), digital signal processing W-ATs (DSPDs), programmable logic W-ATs (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors or demodulators. The memory unit may be implemented within the processor or external to the processor, in which case it can be communicatively coupled to the processor via various means.

The previous description of the disclosed embodiments is provided to enable any person skilled in the art to make or use the features, functions, operations, and embodiments disclosed herein. Various modifications to these embodiments may be readily apparent to those skilled in the art, and the generic principles defined herein may be applied to other embodiments without departing from their spirit or scope. Thus, the present disclosure is not intended to be limited to the embodiments shown herein but is to be accorded the widest scope consistent with the principles and novel features disclosed herein.

The invention claimed is:

1. A method of receiving targeted content messages on a wireless access terminal (W-AT), the method comprising:
    selecting at least one message reception time at which to receive a first targeted content message based on a user profile and a message delivery schedule; and
    receiving at least the first targeted content message at the selected message reception time via a wireless link,
    wherein the first targeted content message corresponds to a targeted advertisement.

2. The method of claim 1, further comprising:
    receiving the message delivery schedule from a remote apparatus.

3. The method of claim 1, wherein the message delivery schedule includes information related to the user profile.

4. The method of claim 1, further comprising:
    engaging the W-AT in a sleep mode based on the message delivery schedule.

5. The method of claim 1, further comprising:
    responding to a sleep mode setting of the W-AT by engaging a sleep mode subsequent to receiving of the first targeted content message.

6. The method of claim 1, wherein in a case of the W-AT being set to a sleep mode at a time where the first targeted content message is to be received according to the message delivery schedule, dis-engaging the sleep mode before or during a contact window specified in the message delivery schedule.

7. The method of claim 6, further comprising:
    responding to a sleep mode setting of the W-AT by engaging the sleep mode subsequent to the receiving of the targeted content message.

8. The method of claim 1, wherein selecting the reception time is performed so as to receive the first targeted content message according to at least one contact window.

9. The method of claim 1, further comprising retaining the targeted content messages in a cache on the W-AT.

10. The method of claim 1, further comprising retaining the targeted content messages in a cache on the W-AT in accordance with rules provided in meta-data associated with the targeted content messages.

11. The method of claim 1, wherein the first targeted content message contains targeting meta-data and a reception time for at least one targeted content message.

12. The method of claim 11, further comprising,
    determining a second reception time for a second targeted content message based on the targeting meta-data and the user profile on the W-AT; and
    receiving the second targeted content message at the second reception time.

13. A wireless access terminal (W-AT) configured to receive targeted content messages, the wireless access terminal comprising:
    means for selecting at least one reception time at which to receive a first targeted content message based on a user profile and a targeted content message delivery schedule; and
    means for receiving at least the first targeted content message at the selected reception time,
    wherein the first targeted content message corresponds to a targeted advertisement.

14. The wireless access terminal of claim 13, further comprising:
    means for receiving the targeted content message delivery schedule.

15. The wireless access terminal of claim 13, further comprising:
    means for responding to a sleep mode setting of the W-AT by engaging a sleep mode subsequent to the receiving of the targeted content message.

16. The wireless access terminal of claim 13, wherein in a case of the W-AT being set to a sleep mode at a time where a message is to be received according to the targeted content message delivery schedule, the W-AT is configured to dis-engage the sleep mode before or during a contact window specified in the targeted content message delivery schedule.

17. The wireless access terminal of claim 16, further comprising:
    means for responding to a sleep mode setting of the W-AT by engaging a sleep mode subsequent to the receiving of the targeted content messages.

18. The wireless access terminal of claim 13, further comprising means for retaining the targeted content messages in a cache on the W-AT.

19. A wireless access terminal (W-AT) configured to receive targeted advertisement messages, the wireless access terminal comprising:
- selection circuitry module configured to select at least one reception time at which to receive a first targeted content message based on a user profile and a targeted content message delivery schedule; and
- receiving circuitry configured to receive at least the first targeted content message at the selected reception time,
- wherein the first targeted content message corresponds to a targeted advertisement.

20. The wireless access terminal of claim 19, wherein the receiving circuitry is further configured to receive the targeted content message delivery schedule.

21. The wireless access terminal of claim 19, further comprising:
- timing circuitry configured to respond to a sleep mode setting of the W-AT by engaging a sleep mode subsequent to the receiving of the first targeted content message.

22. The wireless access terminal of claim 19, wherein in a case of the W-AT being set to a sleep mode at a time where a message is to be received according to the targeted content message delivery schedule, the W-AT is configured to dis-engage the sleep mode before or during a contact window specified in the targeted content message delivery schedule.

23. The wireless access terminal of claim 22, further comprising:
- timing circuitry configured to respond to a sleep mode setting of the W-AT by engaging a sleep mode subsequent to the receiving of the first targeted content message.

24. A non-transitory computer-readable medium containing instructions stored thereon, which, when executed by a wireless access terminal (W-AT), cause the W-AT to perform operations, the instructions comprising:
- a first set of instructions for selecting at least one message reception time at which to receive a first targeted content message based on a user profile and a message delivery schedule; and
- a second set of instructions for receiving at least the first targeted content message at the selected message reception time via a wireless link,
- wherein the first targeted content message corresponds to a targeted advertisement.

25. The non-transitory computer-readable medium of claim 24, further comprising:
- a third set of instructions for receiving the message delivery schedule from a remote apparatus.

26. The non-transitory computer-readable medium of claim 24, further comprising:
- a fourth set of instructions for responding to a sleep mode setting of the W-AT by engaging a sleep mode subsequent to receiving of the first targeted content message.

27. The non-transitory computer-readable medium of claim 24, further comprising:
- a fifth set of instructions for dis-engaging a sleep mode before or during a contact window specified in the message delivery schedule in a case of the W-AT being set to sleep mode at a time where the first targeted content message is to be received according to the message delivery schedule.

28. One or more integrated circuits that together comprise:
- selection circuitry module configured to select at least one reception time at which to receive a first targeted content message based on a user profile and a targeted content message delivery schedule; and
- receiving circuitry configured to receive at least the first targeted content message at the selected reception time,
- wherein the first targeted content message corresponds to a targeted advertisement.

29. An apparatus, comprising:
processing circuitry; and
a memory coupled to the processing circuitry that includes:
- a first set of instructions for selecting at least one message reception time at which to receive a first targeted content message based on a user profile and a message delivery schedule; and
- a second set of instructions for receiving at least the first targeted content message at the selected message reception time via a wireless link,
- wherein the first targeted content message corresponds to a targeted advertisement.

30. The method of claim 11, wherein both the first targeted content message and the at least one targeted content message correspond to advertisement messages.

31. The method of claim 1, wherein the message delivery schedule only specifies times at which advertisements are to be transmitted via the wireless link.

32. The method of claim 1, wherein the message delivery schedule and the first targeted content message are each received on a given channel on the wireless link.

33. The method of claim 32,
- wherein the message delivery schedule includes a plurality of contact window schedules that each schedule a particular targeted advertisement in a particular contact window on the given channel, and
- wherein each contact window schedule is transmitted prior to its corresponding contact window on the given channel.

* * * * *